(12) United States Patent
Menefee et al.

(10) Patent No.: US 10,599,921 B2
(45) Date of Patent: Mar. 24, 2020

(54) VISUAL LANGUAGE INTERPRETATION SYSTEM AND USER INTERFACE

(71) Applicant: AVODAH, INC., Wilmington, DE (US)

(72) Inventors: Michael Menefee, Richardson, TX (US); Dallas Nash, Frisco, TX (US); Trevor Chandler, Thornton, CO (US)

(73) Assignee: AVODAH, INC., Wilmington, DE (US)

( * ) Notice: Subject to any disclaimer, the term of this patent is extended or adjusted under 35 U.S.C. 154(b) by 0 days.

(21) Appl. No.: 16/270,540

(22) Filed: Feb. 7, 2019

(65) Prior Publication Data

US 2019/0251344 A1    Aug. 15, 2019

Related U.S. Application Data

(60) Provisional application No. 62/629,398, filed on Feb. 12, 2018, provisional application No. 62/664,883, filed on Apr. 30, 2018.

(51) Int. Cl.

| | |
|---|---|
| *G06K 9/00* | (2006.01) |
| *G06F 17/28* | (2006.01) |
| *G06N 3/08* | (2006.01) |
| *G06F 3/01* | (2006.01) |
| *G09B 21/00* | (2006.01) |

(Continued)

(52) U.S. Cl.
CPC ......... *G06K 9/00355* (2013.01); *G06F 3/013* (2013.01); *G06F 3/017* (2013.01); *G06F 3/167* (2013.01); *G06F 17/28* (2013.01); *G06F 17/289* (2013.01); *G06K 9/00248* (2013.01); *G06K 9/00315* (2013.01); *G06N 3/0454* (2013.01); *G06N 3/08* (2013.01); *G06T 7/20* (2013.01); *G06T 7/73* (2017.01); *G09B 21/00* (2013.01); *G09B 21/009* (2013.01); *G10L 15/22* (2013.01); *G10L 15/24* (2013.01); *G10L 15/265* (2013.01); *H04N 5/247* (2013.01); *G06K 9/00335* (2013.01); *G06T 3/4046* (2013.01);

(Continued)

(58) Field of Classification Search
USPC .......................... 382/100, 103; 361/679.04
See application file for complete search history.

(56) References Cited

U.S. PATENT DOCUMENTS

| | | |
|---|---|---|
| 5,481,454 A | 1/1996 | Inoue |
| 5,544,050 A | 8/1996 | Abe |

(Continued)

FOREIGN PATENT DOCUMENTS

JP    2017111660 A    6/2017

OTHER PUBLICATIONS

Chandler, T. et al. U.S. Appl. No. 16/270,532 Non-final Office Action dated Mar. 28, 2019, (pp. 1-21).

(Continued)

*Primary Examiner* — Ishrat I Sherali

(74) *Attorney, Agent, or Firm* — Perkins Coie LLP

(57) ABSTRACT

Methods, apparatus and systems for a sign language recognition are disclosed. One example of a sign language recognition device includes a primary display facing a first direction and a secondary display facing a second direction. One or more cameras are positioned adjacent the secondary display and face the second direction, wherein an image captured by the one or more cameras is displayed on at least a portion of the primary display.

14 Claims, 41 Drawing Sheets

(51) Int. Cl.

| | | |
|---|---|---|
| *G06F 3/16* | (2006.01) | |
| *G10L 15/22* | (2006.01) | |
| *G10L 15/24* | (2013.01) | |
| *G10L 15/26* | (2006.01) | |
| *H04N 5/247* | (2006.01) | |
| *G06T 7/73* | (2017.01) | |
| *G06N 3/04* | (2006.01) | |
| *G06T 7/20* | (2017.01) | |
| *G10L 13/00* | (2006.01) | |
| *G06T 3/40* | (2006.01) | |
| *G06T 17/00* | (2006.01) | |

(52) U.S. Cl.
CPC .... *G06T 17/00* (2013.01); *G06T 2207/20084* (2013.01); *G10L 13/00* (2013.01)

(56) References Cited

U.S. PATENT DOCUMENTS

| | | | |
|---|---|---|---|
| 5,659,764 A | 8/1997 | Sakiyama | |
| 5,704,012 A | 12/1997 | Bigus | |
| 5,887,069 A | 3/1999 | Sakou | |
| 6,477,239 B1 | 11/2002 | Ohki | |
| 6,628,244 B1* | 9/2003 | Hirosawa | G06F 1/1626 |
| | | | 345/1.1 |
| 7,027,054 B1 | 4/2006 | Cheiky | |
| 7,702,506 B2* | 4/2010 | Yoshimine | G09B 21/04 |
| | | | 379/52 |
| 8,488,023 B2 | 7/2013 | Bacivarov et al. | |
| 8,553,037 B2 | 10/2013 | Smith | |
| 9,418,458 B2 | 8/2016 | Chertok | |
| 10,037,458 B1 | 7/2018 | Mahmoud | |
| 2002/0069067 A1* | 6/2002 | Klinefelter | G06Q 10/10 |
| | | | 704/270.1 |
| 2003/0191779 A1 | 10/2003 | Sagawa | |
| 2004/0210603 A1* | 10/2004 | Roston | G06F 17/2836 |
| 2005/0258319 A1* | 11/2005 | Jeong | F16M 11/105 |
| | | | 248/176.1 |
| 2006/0082518 A1* | 4/2006 | Ram | G06F 1/1601 |
| | | | 345/1.1 |
| 2006/0134585 A1 | 6/2006 | Adamo-Villani | |
| 2006/0204033 A1* | 9/2006 | Yoshimine | G09B 21/009 |
| | | | 382/103 |
| 2008/0013793 A1 | 1/2008 | Hillis | |
| 2008/0013826 A1 | 1/2008 | Hillis | |
| 2008/0024388 A1* | 1/2008 | Bruce | G06F 1/1616 |
| | | | 345/1.1 |
| 2010/0044121 A1 | 2/2010 | Simon | |
| 2010/0194679 A1 | 8/2010 | Wu et al. | |
| 2011/0221974 A1 | 9/2011 | Stem | |
| 2011/0228463 A1* | 9/2011 | Matagne | G06F 1/1649 |
| | | | 361/679.04 |
| 2011/0274311 A1* | 11/2011 | Lee | G06K 9/00 |
| | | | 382/100 |
| 2013/0318525 A1 | 11/2013 | Palanisamy | |
| 2013/0334376 A1* | 12/2013 | Moscovitch | B60R 11/02 |
| | | | 248/125.1 |
| 2014/0101578 A1* | 4/2014 | Kwak | G06F 3/017 |
| | | | 715/761 |
| 2015/0092008 A1* | 4/2015 | Manley | H04L 65/403 |
| | | | 348/14.07 |
| 2015/0317304 A1 | 11/2015 | An | |
| 2016/0196672 A1 | 7/2016 | Chertok | |
| 2016/0267349 A1 | 9/2016 | Shoaib | |
| 2016/0320852 A1 | 11/2016 | Poupyrev | |
| 2016/0379082 A1 | 12/2016 | Rodriguez et al. | |
| 2017/0090995 A1 | 3/2017 | Jubinski | |
| 2017/0153711 A1 | 6/2017 | Dai | |
| 2017/0206405 A1 | 7/2017 | Molchanov et al. | |
| 2017/0236450 A1 | 8/2017 | Jung et al. | |
| 2017/0255832 A1 | 9/2017 | Jones et al. | |
| 2017/0351910 A1 | 12/2017 | Elwazer | |
| 2018/0018529 A1 | 1/2018 | Hiramatsu | |
| 2018/0032846 A1 | 2/2018 | Yang et al. | |
| 2018/0047208 A1 | 2/2018 | Marin | |
| 2018/0101520 A1 | 4/2018 | Fuchizaki | |
| 2018/0137644 A1 | 5/2018 | Rad et al. | |
| 2018/0181809 A1 | 6/2018 | Ranjan | |
| 2018/0189974 A1 | 7/2018 | Clark | |
| 2018/0268601 A1 | 9/2018 | Rad | |
| 2018/0373985 A1 | 12/2018 | Yang | |
| 2018/0374236 A1 | 12/2018 | Ogata | |
| 2019/0026956 A1 | 1/2019 | Gausebeck | |
| 2019/0043472 A1 | 2/2019 | Garcia | |
| 2019/0064851 A1 | 2/2019 | Tran | |
| 2019/0066733 A1 | 2/2019 | Somanath | |

OTHER PUBLICATIONS

Chandler, T. et al. U.S. Appl. No. 16/258,514 Notice of Allowance dated Mar. 27, 2019, (pp. 1-8).
Chanler, T. et al. U.S. Appl. No. 16/258,531 Notice of Allowane dated Mar. 25, 2019, (pp. 1-8).
Chandler, T. et al. U.S. Appl. No. 16/258,524 Notice of Allowance dated Apr. 23, 2019, (16 pages).
International Application No. PCT/US2019/017299, International Search Report and Written Opinion dated May 31, 2019 (12 pages).
Chandler, T. et al. U.S. Appl. No. 16/270,532, Notice of Allowance dated Aug. 12, 2019, (11 pages).
Chandler, T. et al. U.S. Appl. No. 16/505,484, Notice of Allowance dated Aug. 21, 2019, (16 pages).

\* cited by examiner

VISUAL LANGUAGE INTERPRETATION SYSTEM AND USER INTERFACE

CROSS-REFERENCE TO RELATED APPLICATIONS

This patent application claims priority to and the benefits of U.S. Provisional Patent Application No. 62/629,398, entitled "INTERACTIVE AUTOMATED SIGN LANGUAGE TRANSLATION METHOD AND APPARATUS," filed Feb. 12, 2018, and U.S. Provisional Patent Application No. 62/664,883, entitled "MULTI-APERTURE SIGN LANGUAGE RECOGNITION METHOD AND APPARATUS," filed Apr. 30, 2018, the disclosures of which are incorporated herein by reference in their entireties.

TECHNICAL FIELD

This document generally relates to devices to enable communications, and more particularly to a device and user interface for communication that includes patterns or gestures.

BACKGROUND

Machine assisted interpersonal communication has simplified both business and personal communications, and has enabled the source and receiver of a communication to be separated in both time and space. Devices for machine assisted interpersonal communication range from the simple answering machine to smartphone-based translation systems that can interpret a language (e.g., French) and translate it into another language for the smartphone user (e.g., spoken or written English).

One specific application of machine assisted interpersonal communication is sign language translation. A sign language (also known as signed language) is a language that uses manual communication to convey meaning, ideas and thoughts, which simultaneously employs hand gestures, movement, orientation of the fingers, arms or body, and facial expressions to convey a speaker's ideas. The complexity of sign language may be captured, in part, by using multiple input and output modalities for its translation and communication.

SUMMARY

Disclosed are devices, systems and methods for Visual Language Interpretation Systems (VLIS) using multiple input and output modalities that can be used to capture and process images for various applications, including automated sign language translation and communication.

In one aspect of the disclosed technology, a sign language recognition device is disclosed. This device can include a primary display facing a first direction and a secondary display facing a second direction. One or more cameras can be positioned adjacent the secondary display facing the second direction. An image captured by the one or more cameras is then displayed on at least a portion of the primary display.

In some embodiments, the primary display is pivotably coupled to the secondary display, whereby the device is configurable between a folded configuration and an unfolded configuration. In some embodiments, the first and second directions face opposite each other when the device is in the folded configuration. In some embodiments, the primary display is slideably coupled to the secondary display. In some embodiments, the device further includes a support stand fixed relative to the secondary display and the one or more cameras. In some embodiments, the primary display is pivotably coupled to the secondary display via the support stand.

In another aspect of the disclosed technology, a sign language recognition device can include a primary display facing a first direction, a secondary display facing a second direction, and one or more cameras positioned adjacent the secondary display and facing the second direction. A support stand can be fixed relative to the secondary display and the one or more cameras, wherein the primary display is pivotably coupled to the secondary display via the support stand. Thus, the device is configurable between a folded configuration and an unfolded configuration. In some embodiments, the support stand carries at least one pivot feature about which the primary display pivots.

In a further aspect of the disclosed technology, a sign language recognition device can include a primary display facing a first direction, a secondary display facing a second direction, and one or more cameras positioned adjacent the secondary display and facing the second direction. An image captured by the one or more cameras can be displayed on at least a portion of the primary display. A support stand can be fixed relative to the secondary display and the one or more cameras. The support stand can include a pair of support arms each carrying a pair of pivot pins, wherein the primary display is pivotably and slideably coupled to the pivot pins. Thus, the device is configurable between a folded configuration and an unfolded configuration such that the first and second directions face opposite each other when the device is in the folded configuration.

In some embodiments, the primary display includes two pairs of grooves each pair positioned on opposite sides of the display to receive corresponding pairs of the pivot pins. In some embodiments, each pair of grooves includes one groove that is longer than the other. In some embodiments, each pair of grooves converge at one end. In some embodiments, the image captured by the one or more cameras is displayed on at least a portion of the secondary display.

In one aspect, the disclosed technology may be used to recognize a sign language communicated by a subject. This can include computer implemented methods for visual language interpretation. In some embodiments, the method includes displaying source text in a first area of a primary display as well as displaying the source text on a secondary display facing a sign language speaker. The method can include receiving video data of the sign language speaker signing an interpretation of the source text displayed on the secondary display. The video data can be displayed in a second area of the primary display for viewing by a user. The sign language speaker's interpretation of the source text can be translated into translation text for display on the primary display for viewing by the user (e.g., to verify the accuracy of the translation). In some embodiments, the translation text is logged for further review and/or incorporation with the source text and recorded video.

In some embodiments, the method can further include recording the video data. In some embodiments, displaying the translation text on the primary display includes overlaying the translation text on the second area of the primary display. In some embodiments, displaying source text in a first area of a primary display includes displaying a current source text and a next source text. In some embodiments, the method can further include detecting when the current source text has been translated and scrolling to the next source text.

In another aspect, the disclosed technology may be used to facilitate communication between a sign language speaker and a non-sign language speaker. This can include computer implemented methods for visual language interpretation and spoken language interpretation. In some embodiments, the method includes receiving video data of a sign language speaker signing and displaying the video data on a primary display. The video data of the sign language speaker signing can be translated into translation text and displayed on the primary display for viewing by a user. The method can also include receiving audio data corresponding to the user's spoken words and translating the audio data into spoken text, which is displayed on a secondary display for viewing by the sign language speaker.

In some embodiments, displaying the translation text on the primary display includes overlaying the translation text on the video data displayed on the primary display. In some embodiments, the method can further include logging the translation text and the spoken text.

In yet another aspect, an apparatus comprising a memory and a processor can implement the above-described methods. In a further aspect, the above described methods may be embodied as processor-executable code and may be stored on a non-transitory computer-readable program medium. The above and other aspects and features of the disclosed technology are described in greater detail in the drawings, the description, and the claims.

DETAILED DESCRIPTION

Figure 1:
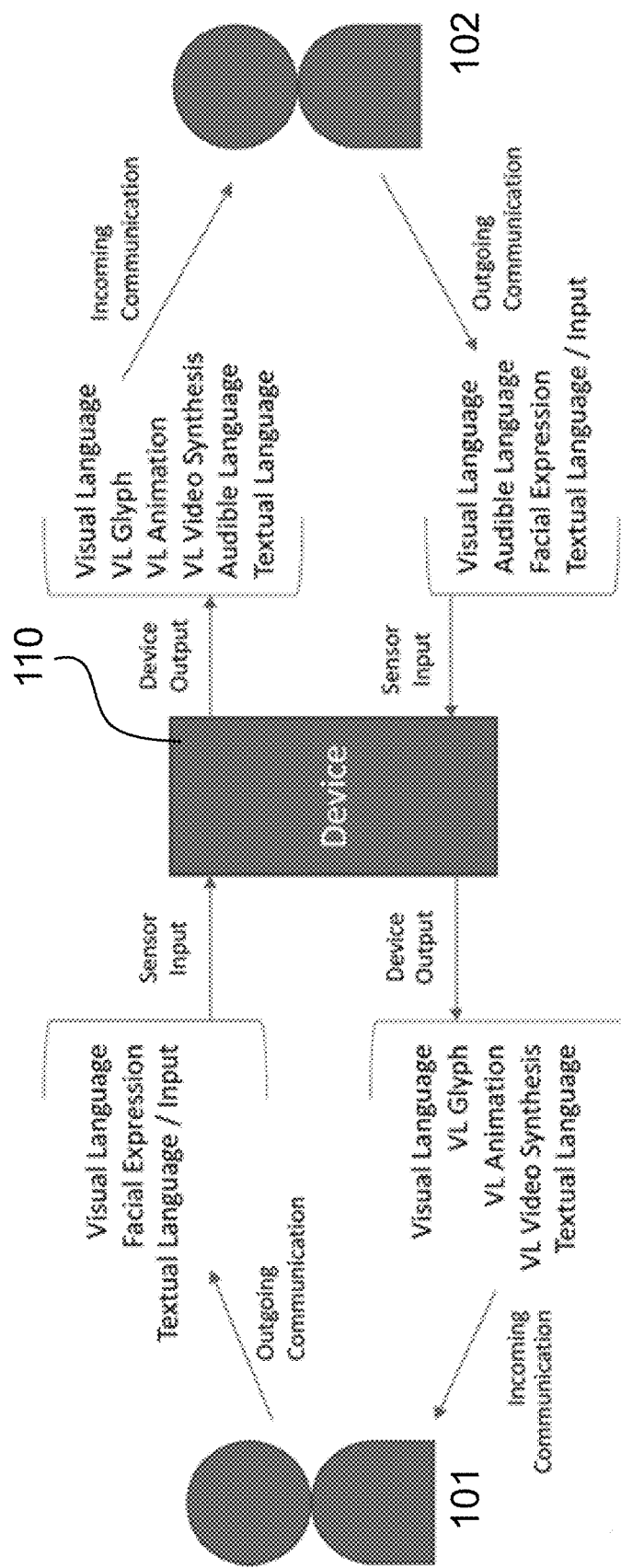
FIG. 1 illustrates a two-way translation system used by two parties in accordance with an example embodiment of the disclosed technology.

Machine-assisted interpersonal communication (or technology-assisted communication) involves one or more people communicating by means of a mechanical or electronic device or devices with one or more receivers. The devices that are used can give the communication permanence (e.g., storage devices) and/or extend its range (e.g., wireless communication) such that the source and receiver can be separated in time and space.

One specific application of using devices for machine-assisted interpersonal communication is sign language communication and translation. Sign languages are extremely complex, and generally do not have a linguistic relation to the spoken languages of the lands in which they arise. The correlation between sign and spoken languages is complex and varies depending on the country more than the spoken language. For example, the US, Canada, UK, Australia and New Zealand all have English as their dominant language, but American Sign Language (ASL), used in the US and English-speaking Canada, is derived from French Sign Language whereas the other three countries sign dialects of British, Australian, and New Zealand Sign Language (collectively referred to as BANZSL). Similarly, the sign languages of Spain and Mexico are very different, despite Spanish being the national language in each country.

Furthermore, unlike spoken languages, in which grammar is expressed through sound-based signifiers for tense, aspect, mood, and syntax, sign languages use hand movements, sign order, and body and facial cues to create grammar. In some cases, even certain uttered sounds or clicks may form a part of the sign language. Such a cue is referred to as a non-manual activity and can vary significantly across different sign languages. It is desirable for a sign-language translation system to capture and process both the hand movements and the non-manual activities to provide an accurate and natural translation for the parties.

Embodiments of the disclosed technology that are implemented for sign language translation are flexible and adaptable in that an input sign language, which can be any one of several sign languages, is converted to an internal representation, which can then be used to translate the input sign language into one or more of a variety of output sign languages. Furthermore, the embodiments described in this document employ a multiplicity of different sensors and processing mechanisms to be able to capture and process information that may not be obtainable when a single sensor or process is used, and to facilitate accurate capture, processing and interpretation of the information to allow translation between different sign languages. In an example, the Bible may be translated from any language to a particular sign language, or from one sign language representation to another, based on the embodiments disclosed in this document. In general, any textual, audible or sign language content may be translated in real-time to corresponding content in another audible, textual or sign language.

FIGS. 1-36 are illustrations offered to provide the proper context for the specific application of a sign language translation system that can benefit from the training techniques described in later sections of this document. FIG. 1 illustrates a two-way translation system used by two parties in accordance with an example embodiment of the disclosed technology. As illustrated in FIG. 1, a device 110 facilitates communication between a first party 101 and a second party 102. The device 110 comprises two sets of sensor inputs and outputs for each of the users. In an example, an outgoing communication of the first party (who may be a sign language user) may be a visual language, a facial expression, or a textual language or input. The device 110 identifies the language used by the first party and translates it into a language understandable by the second party, and outputs it based on a preference of the second party. In another example, as a part of the incoming communication, the device may provide the translated output as a visual language (e.g., another sign language) that may include glyphs, animations or video synthesis (e.g., avatars), or in an audible or textual language.

This process can be inverted by the device in that an outgoing communication of the second party, which now may also be in an audible language, is identified and translated for the first party. The device may output the translation as an incoming communication for the party as a type of visual language or a textual language. The device may input the visual language, audible language, facial expression, or textural language or input as an outgoing communication from the party. In some embodiments, the language choice or preference of either party may be identified by the device. In other embodiments, the language choice or preference may be predetermined or selected in real-time. It is noted that the example system of FIG. 1 allows communications between two sign language users, or a sign language user and a non-sign language user.

Figure 2:
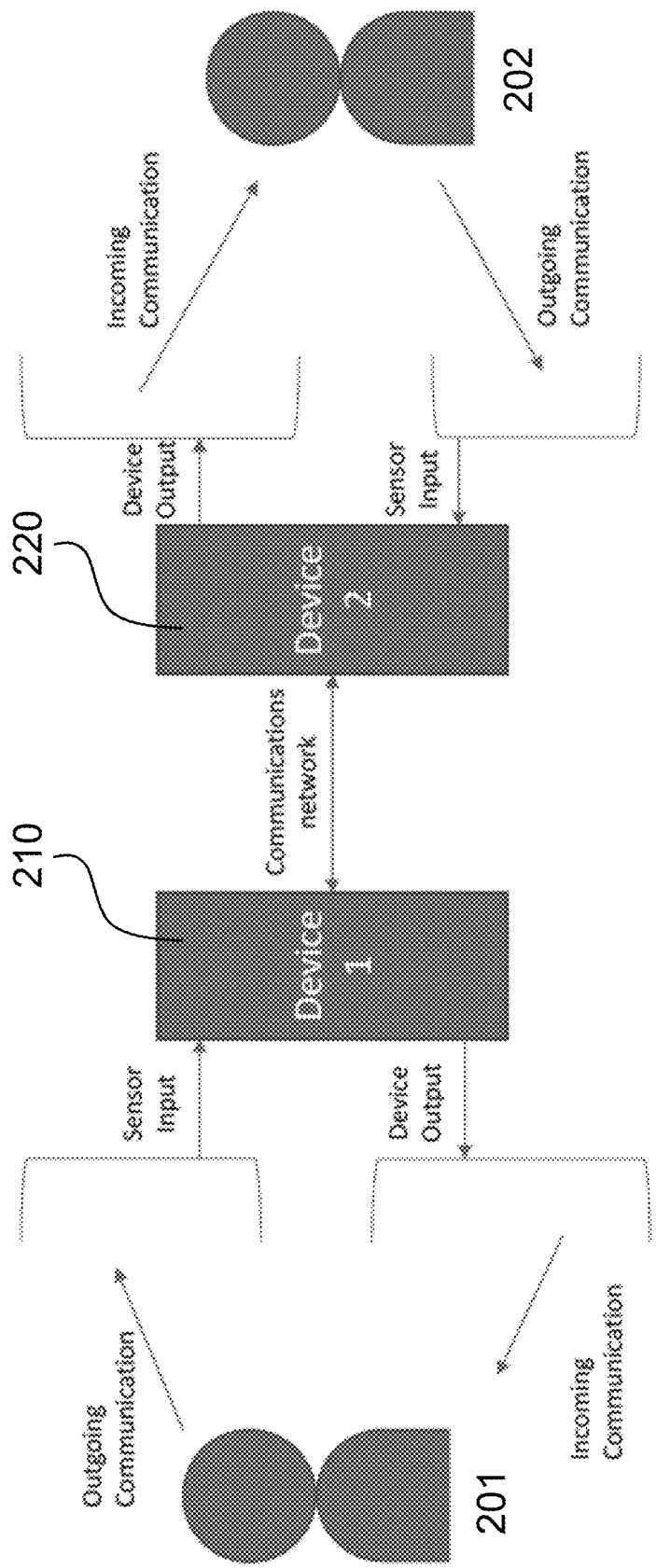
FIG. 2 illustrates a remote two-way translation system used by two parties that may be in different locations over a communication network in accordance with an example embodiment of the disclosed technology.

FIG. 2 illustrates a remote two-way translation system used by two parties that may be in different locations over a communication network in accordance with an example embodiment of the disclosed technology. As illustrated in FIG. 2, the first party 201 and a second party 202 need not necessarily be co-located as long as they have access to a communication network that allows the exchange of information from one location to another location. In the depicted scenario, two devices 210 and 220 are connected via a communication network, which can be a wired network or a wireless network such as a Wi-Fi network, a personal area network, or a mobile network. As in the case of FIG. 1, the remote two-way translation system allows communications between two sign language users, or a sign language user and a non-sign language user.

Figure 3:
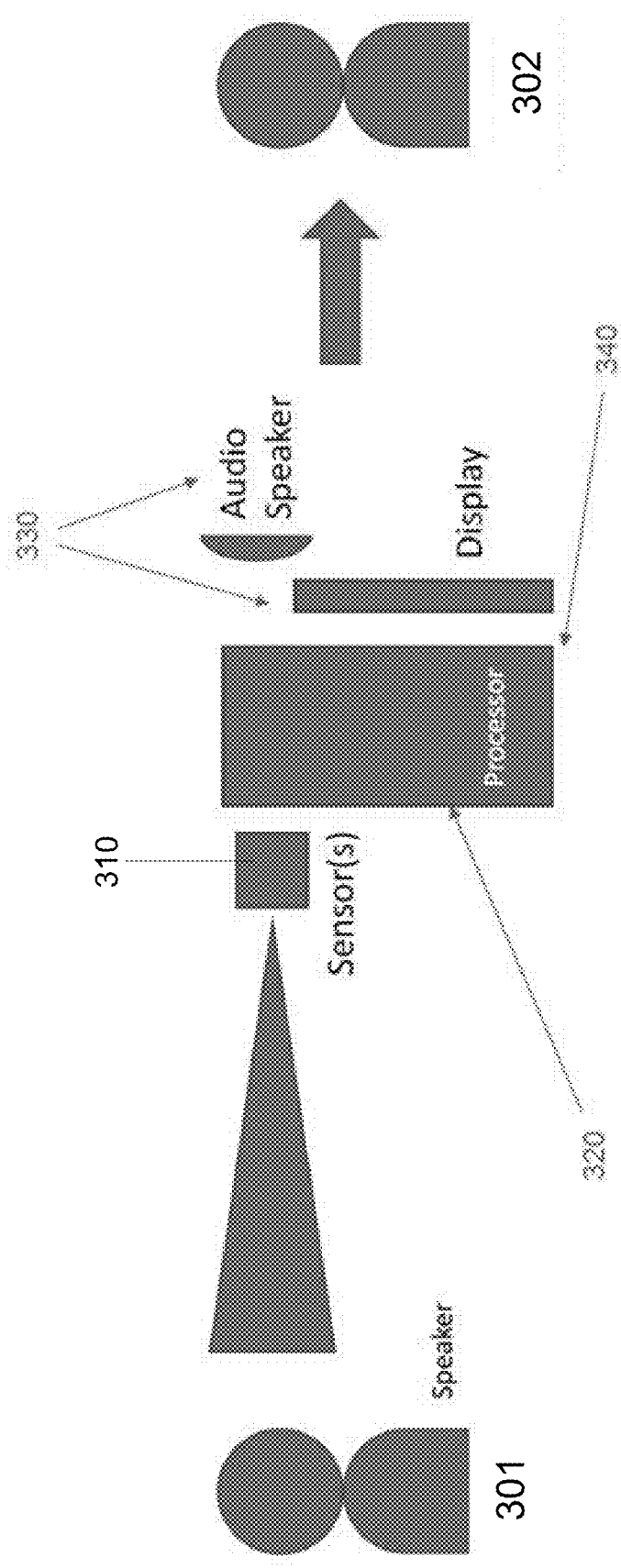
FIG. 3 illustrates a one-way translation system used by two parties in accordance with an example embodiment of the disclosed technology.

FIG. 3 illustrates a one-way translation system used by two parties 301, 302 in accordance with an example embodiment of the disclosed technology. This example includes some features and/or components that are similar to those illustrated in FIGS. 1-2, and described above, and their description is not repeated. As illustrated in FIG. 3, one or more sensors 310 capture one or more aspects of the sign language speaker and/or the speaker's environment and generate a digital representation of what is being observed. As will be described in later sections of this document, the one or more sensors 310 can include a variety of audio, video, motion, haptic and other types of sensors. In some embodiments, the video rate of the sensor data capture may be selected based on the sign language input due to the increased complexity of some sign languages. The digital representation of the sign language communication may include one or more gestures, facial cues, body cues, or environmental factors.

The captured information, including the captured video, is then processed by one or more processors 320 to identify the input sign language, recognize individual gestures and other features of the communication, and translate the communication to an internal representation. The internal representation of the sign language communication can then be converted to an appropriate language and/or format and displayed or audibly output in the language of the second party by various output devices 330, such as displays, speakers, and haptic devices. In some embodiments, the second language may be either a predetermined language or selected by the second party. In other embodiments, a second translation or transformation may be performed if it is detected that certain output devices are not present, or if the user selects an alternate output option.

Figure 4:
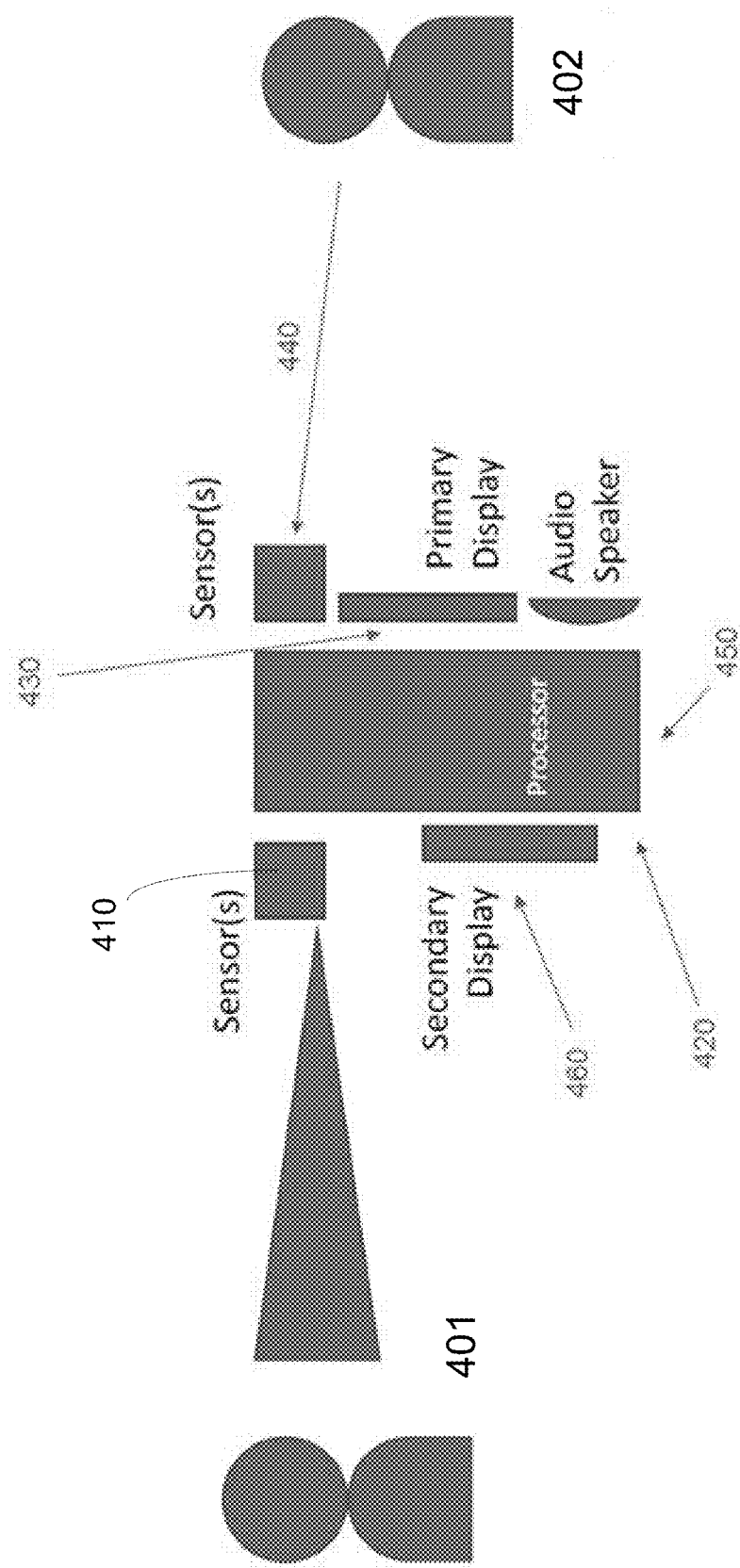
FIG. 4 illustrates another two-way interactive translation system implemented to enable communications by two parties in accordance with an example embodiment of the disclosed technology.

FIG. 4 illustrates another two-way interactive translation system implemented to enable communications by two parties 401, 402 in accordance with an example embodiment of the disclosed technology. As illustrated in FIG. 4, the translation system includes one or more sensors 410, one or more processors 420, and various output devices that are similar to the components described above, and their description is not repeated. In FIG. 4, the one or more sensors 410 are able to receive audible or physical input from the second party 402, who wishes to communicate with the sign language speaker (the first party 401). In some embodiments, the translation system includes additional input interfaces, such as a keyboard or a touchscreen, to receive physical input from the second party 402.

The audible or textual input from the second party is processed by the processor and converted to the internal representation. This internal representation of the second party's communication is then translated to the sign language of the first party 401 and displayed via a secondary display 460. In some embodiments, the first party may receive the input as text, graphic (glyph-like) or through an animated figure representation of the second party. In other embodiments, the two-way translation between a sign language and a textual, audible or different sign language may be performed in real-time.

Figure 5:
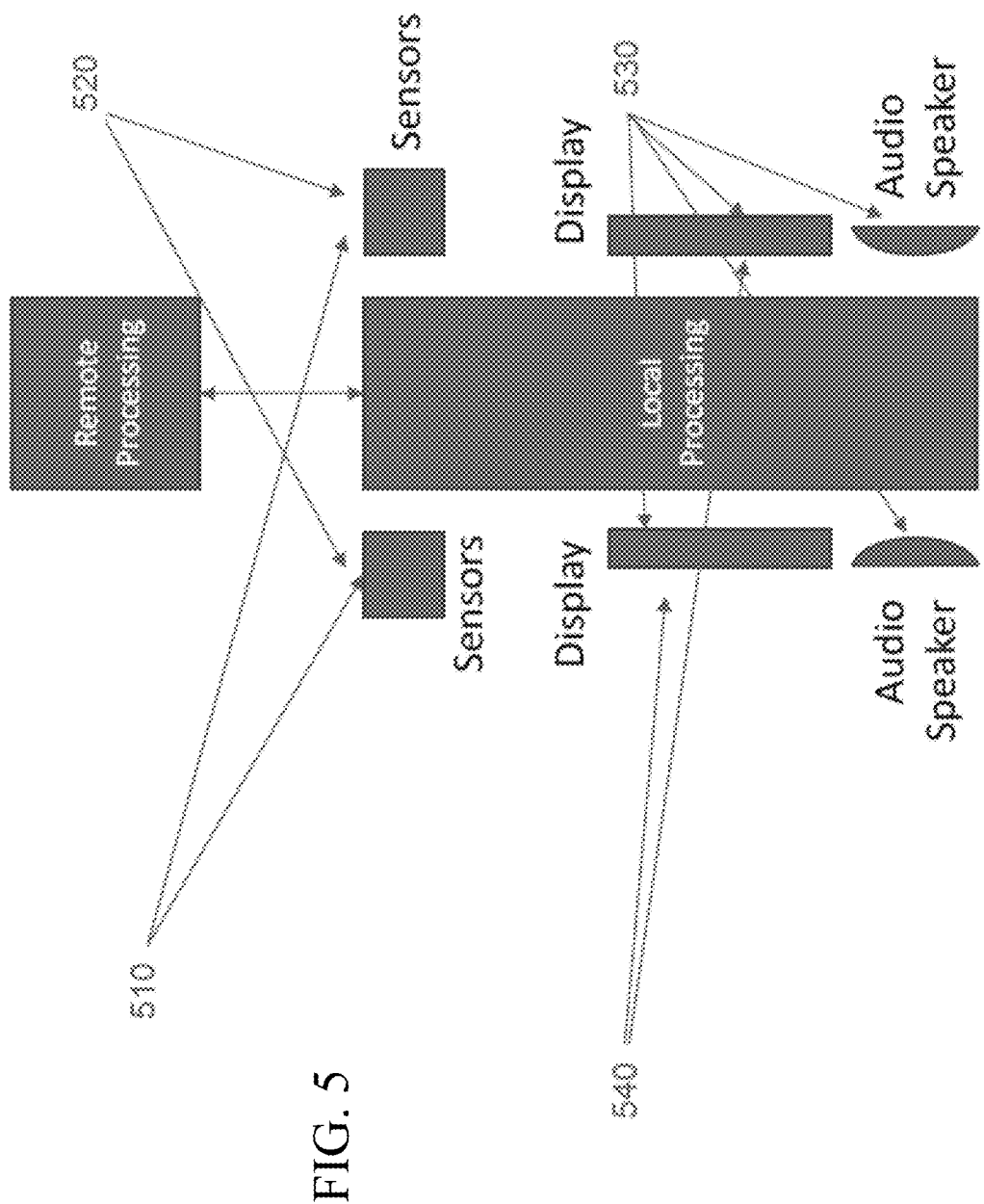
FIG. 5 illustrates a configurable automated translation system in accordance with an example embodiment of the disclosed technology.

FIG. 5 illustrates a configurable automated translation system in accordance with an example embodiment of the disclosed technology. As illustrated in FIG. 5, embodiments of the disclosed technology may include a number of different visual language sensors 510. In an example, the visual language sensors may include one or more of an RGB color camera, a monochrome camera, a 3D stereo camera, structured light emitter, a 3D processor of structured light, a time-of-flight emitter and camera, a non-visual electromagnetic sensor and a non-visual electro-optical sensor. The system may also include standard input devices 520, e.g. a microphone, a microphone array or 3D microphone, a touchscreen keyboard, or a physical keyboard.

In addition to the input sensors described above, the device includes a host of output capabilities. For example, standard language rendering may be performed using a textual display or a speaker 530. On the other hand, the sign language output may include textual, graphical (glyphs, etc.), animated (virtual hands, avatars, etc.) or synthesized video (from a library of basic visual language gestures) outputs, which can be demonstrated to the user via another textual display or speaker 540.

FIG. 5 also illustrates that the processing of the input language from the first party, and specifically the translation from an input language to the internal representation and subsequently to the language of the second party, can be performed either locally, remotely or both. In some embodiments, the device may have access to cloud computing resources, which may be leveraged in, for example, configurations where many different output sign languages are to be supported.

Figure 6:
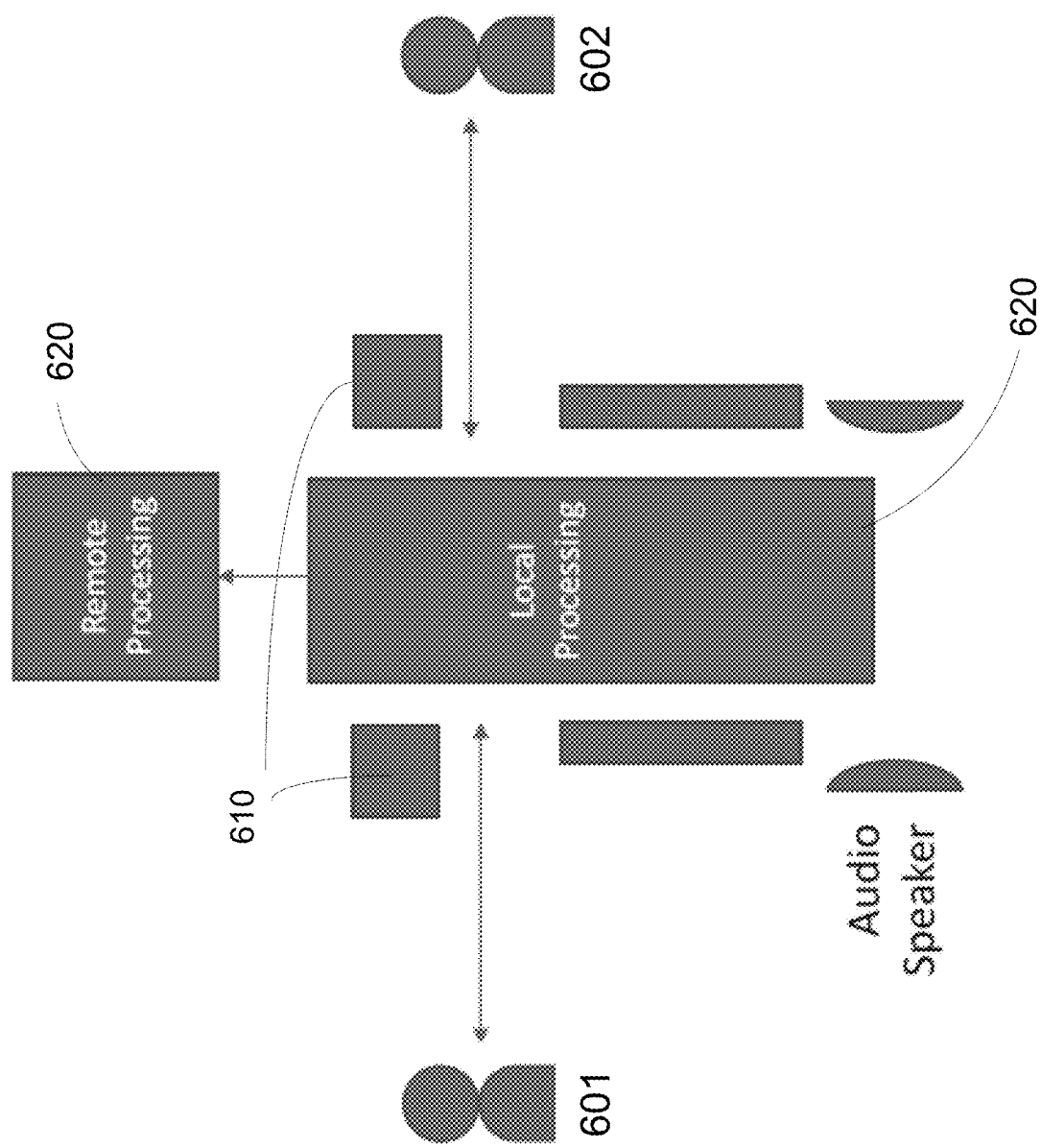
FIG. 6 illustrates another configurable automated translation system in accordance with an example embodiment of the disclosed technology.

FIG. 6 illustrates another configurable automated translation system in accordance with an example embodiment of the disclosed technology. As illustrated in FIG. 6, the translation system includes one or more sensors 610, one or more processors 620, and various output devices that are similar to the components described in the examples above, and the corresponding description is not repeated. In some embodiments, the first party 601 or the second party 602 is not necessarily a person but could be automata. For example, a sign language user may communicate with a virtual assistant, an interactive response agent, or simply an alert generation mechanism. Embodiments of the disclosed technology are flexible and adaptable to be able to support the translation of languages between sign language users, audible language speakers, and automata, and any combination of the above. In part, this is achieved by translating the input language to an internal representation, and then translating it to the required one or more output languages.

In an example, the Bible may be translated into American Sign Language (ASL) which is one of the most commonly used sign languages. Expert input, e.g. interpretation and context for specific verses or sections, may be used to improve the translation during the training period. The ASL-translated Bible may be then displayed using an avatar in a less commonly used sign language that is not ASL. In some embodiments, both the first and second parties may be sign language users, and furthermore, may not use the same sign language.

Figure 7:
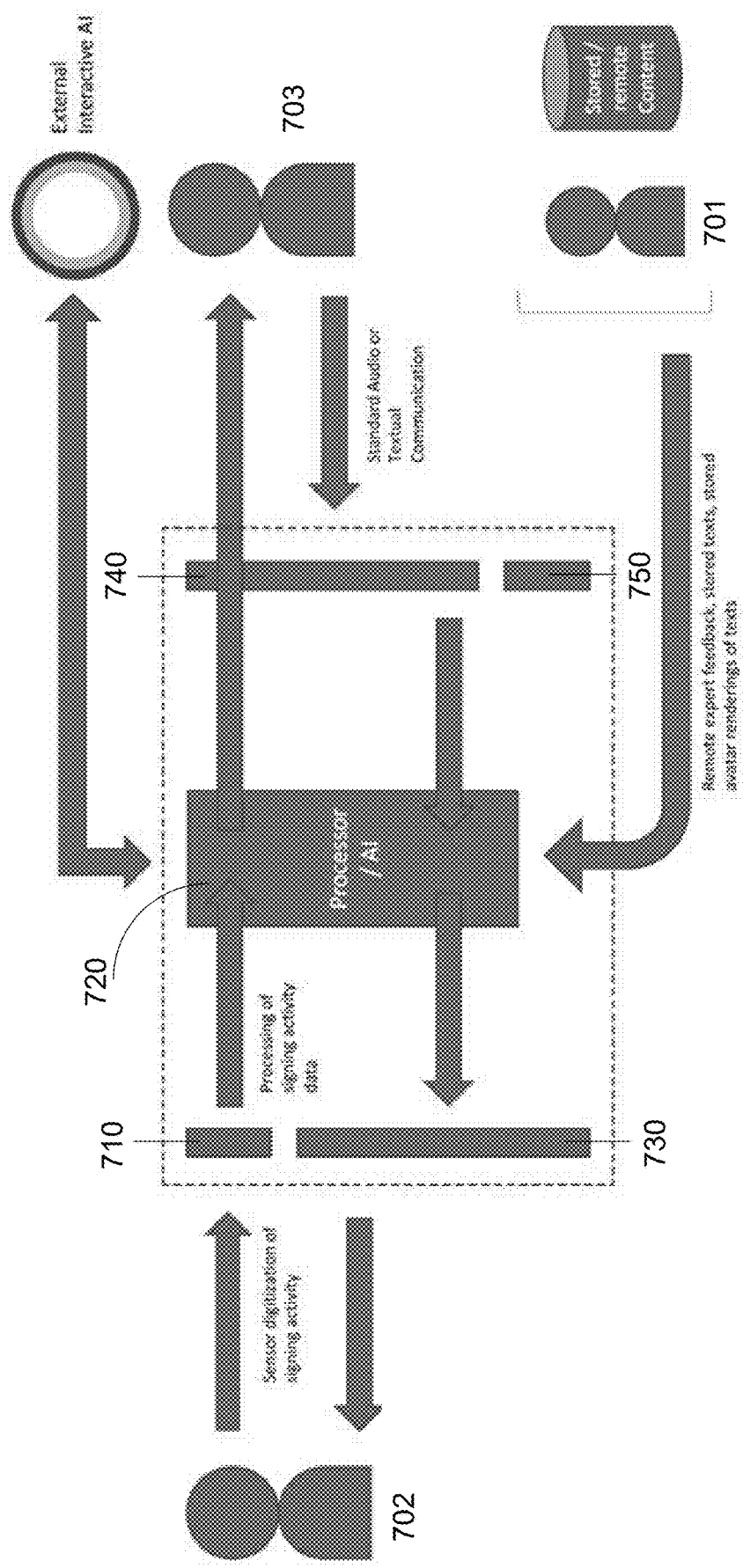
FIG. 7 illustrates yet another configurable automated translation system in accordance with an example embodiment of the disclosed technology.

FIG. 7 illustrates yet another configurable automated translation system in accordance with an example embodiment of the disclosed technology. The automated sign language translation system can be used to translate specific literature or material, e.g. the Bible or works by a particular author. In these scenarios, a remote expert 701 may provide additional context and insight as part of the automated translation process. For example, idiomatic and situational context related to specific content may be used in the training of the neural network and may result in a more natural and useful translation into one of many sign languages.

FIG. 7 illustrates, in part, the digitization of signing activity that is received using a number of sensors 710 that can sense signing activities of a user who uses sign language (s) (also referred to as an SL user 702). The captured data is then fed to one or more processors 720 for processing. Due to the complexity of sign language, and in an effort to support many sign languages, the amount of data that is captured may be prohibitive. Thus, embodiments of the disclosed technology may leverage data that has previously been captured and digitized to reduce the amount of data that needs to be stored when the device is being used in real-time, either locally or in a remote setting. The device then outputs textual or avatar rendering of communication or content to the SL user via the front display 730 of the device.

The device can also include a rear display 740 to show textual or audio communication or content to a user that does not use sign languages (also referred to as a non-SL user 703). The device can receive standard audio or textual communication from the non-SL user and may include a rear control 750 for the non-SL user 703 to control the device.

In some embodiments, the device may be effectively used to perform sign language translations in a remote region, where access to studios and/or more sophisticated computer technology is non-existent or very limited. In an example, a basic corpus of a sign language that is used in a remote area may be used to initially train the neural network and will allow translations upon arrival to that region. After the system is deployed there, the corpus may be expanded exponentially based on input by native sign language users, which will improve the translation capabilities due to iterative training and interpretation (or execution) cycles of the neural network.

Figure 8B:
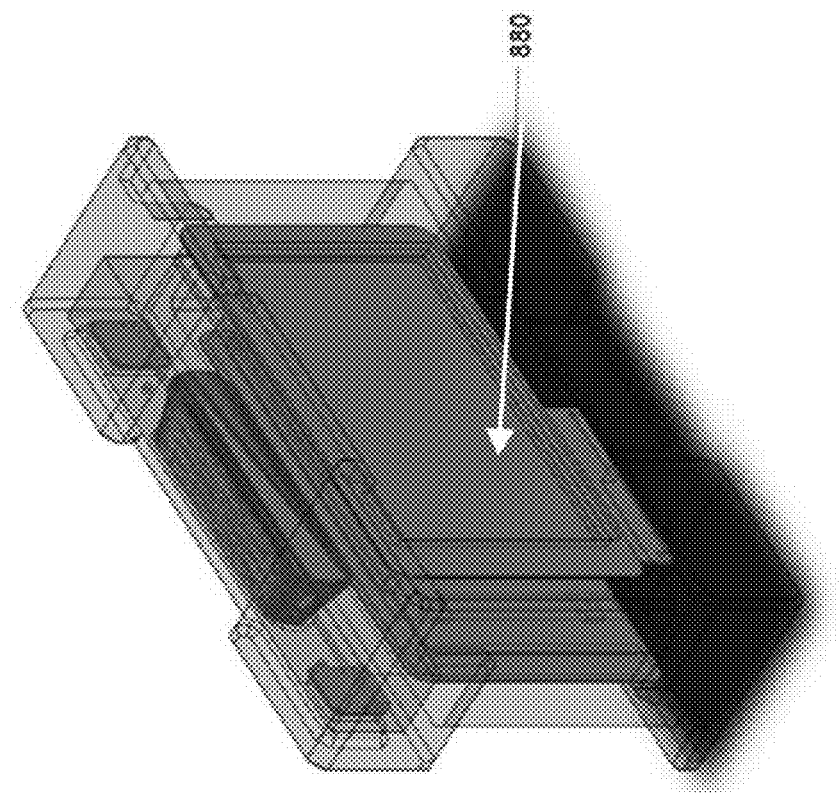
FIG. 8B illustrates another view of an image capture and processing device that can be used for automated sign language translation in accordance with an example embodiment of the disclosed technology.
Figure 8A:
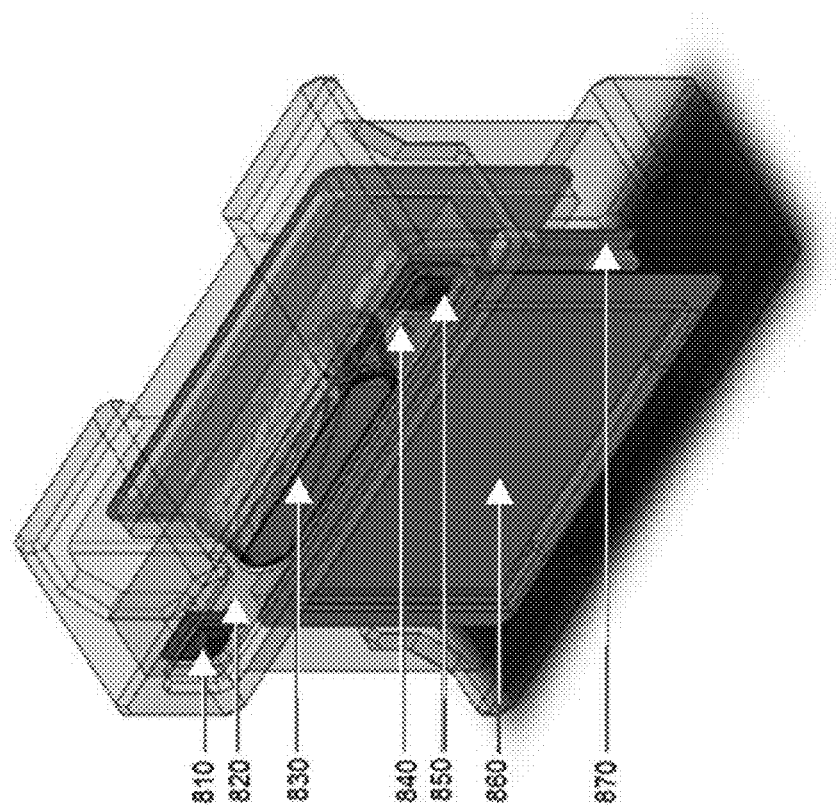
FIG. 8A illustrates one view of an image capture and processing device that can be used for automated sign language translation in accordance with an example embodiment of the disclosed technology.

FIGS. 8A and 8B illustrate different views of an image capture and processing device that can be used for automated sign language translation in accordance with an example embodiment of the disclosed technology. As illustrated in FIG. 8A, the image capture and processing device may include a right camera 810 and a left camera 850 to be able to capture a moving object or scene (e.g., a sign language speaker) from different points of view, therein increasing the depth of field measurements that enable more accurate interpretation of the scene such as the sign language gestures. Similarly, the inclusion of a right microphone 820 and a left microphone 840 enable different contextual and environmental cues to be captured.

The image capture and processing device further comprises stereo (or 3D) camera 830, a front display 830, and one or more processors 870. In some embodiments, the one or more processors include an ARM Cortext-M3 processor and at least one graphics processing unit (GPU). In other embodiments, and as illustrated in FIG. 8B, the device may further comprise a rear display 880, which may be a touchscreen display. In some embodiments, the stereo camera 830 may be replaced or augmented by a depth sensor or multi-aperture camera, which may be configured to measure the "depth" or distance from the camera focal baseline to the object corresponding to a particular pixel in the scene.

Figure 9:
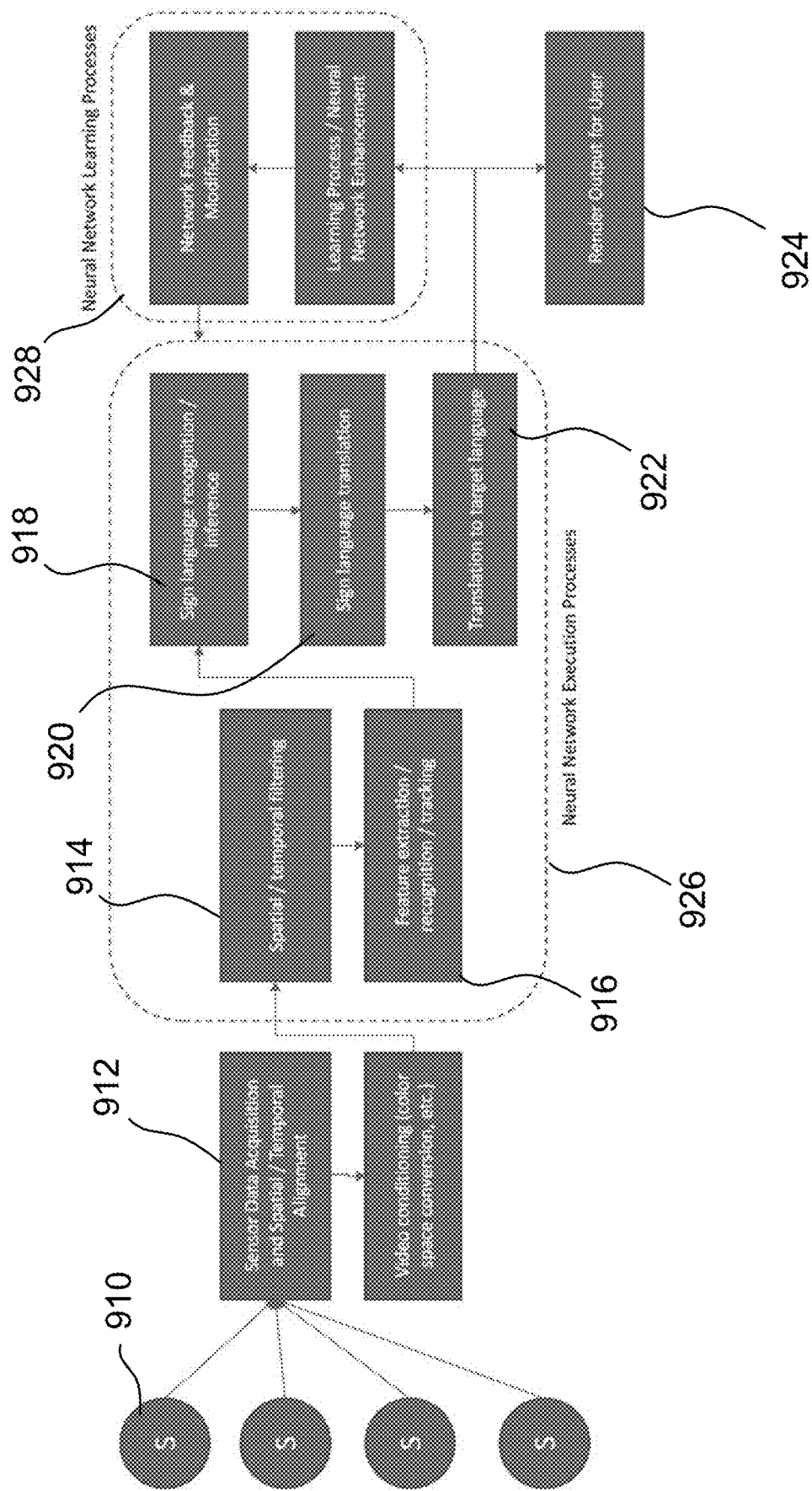
FIG. 9 illustrates a flow diagram of operations that can be carried out by various components to implement automated sign language translation in accordance with an example embodiment of the disclosed technology.

FIG. 9 illustrates an example flow diagram of operations that can be carried out by various component to implement automated sign language translation in accordance with one or more embodiments of the disclosed technology. This example includes some features and components that are similar to those described above, and their description is not repeated.

As illustrated in FIG. 9, multiple sensors 910 may each capture a communication of a sign language user. In an example, using multiple sensors enables environmental factors to be acquired, and provides better depth of field measurements of sign language gestures. In some exemplary operations, a set of preprocessing operations 912 can be performed. For example, the input data collected from the multiple sensors is first aligned, both spatially and temporally. For example, based on the video quality and the external lighting and other conditions, video conditioning procedures (e.g. color space conversion) may be implemented. This operation may be followed by spatial and temporal filtering 914 to, for example, reduce the data to a particular resolution, retain data for only a particular spatial zone of interest or a temporal period of interest. The processing may further include the application of image and/or video processing methods 916, e.g. edge detection, which conditions the data for additional processing.

The conditioned data of the communication from the sign language user can then be processed in order to extract features of gestures, facial cues and body cues, amongst other features that enable the identification of the sign language 918. The input sign language is translated 920 to an internal representation, and subsequently translated to the target language 922. The output is then rendered 924 to the user.

In some embodiments, the feature extraction, identification and translation may be part of a neural network execution process 926. Before the neural network starts the execution process, the neural network is trained by the neural network learning process 928. The techniques discussed in later sections of this document can be implemented in the neural network learning process 928 to allow the trained neural network to recognize a large number of characteristics in the input data more efficiency and more accurately. To perform the neural network learning process 928, a set of training data can be used to carry out training algorithms such as supervised training of the neural network. In some embodiments, as part of feedback for the learning process, the translated sign language is used to further train and modify the neural network to improve its identification and translation capabilities. In yet other embodiments, reinforcement training of neural networks may be employed to improve performance and increase the flexibility and adaptability of embodiments of the disclosed technology.

In some embodiments, artificial intelligence speech to text and text to speech translation can be enabled via TensorFlow. TensorFlow is an open-source software library for dataflow programming across a range of tasks. It is a symbolic math library, and is also used for machine learning applications such as neural networks. The system can use DeepSpeech and Tacotron/wavenet networks. Example audio training material can be used to allow the networks to be trained on the same material as a user would be using via audio. Recognizing a sign language communicated by a subject is also described in co-pending U.S. patent application Ser. No. 16/258,509, filed Jan. 25, 2019, entitled "USING MULTIPLE INPUT AND OUTPUT MODALITIES FOR AUTOMATED SIGN LANGUAGE TRANSLATION AND COMMUNICATION," the disclosure of which is incorporated herein by reference in its entirety.

Figure 10:
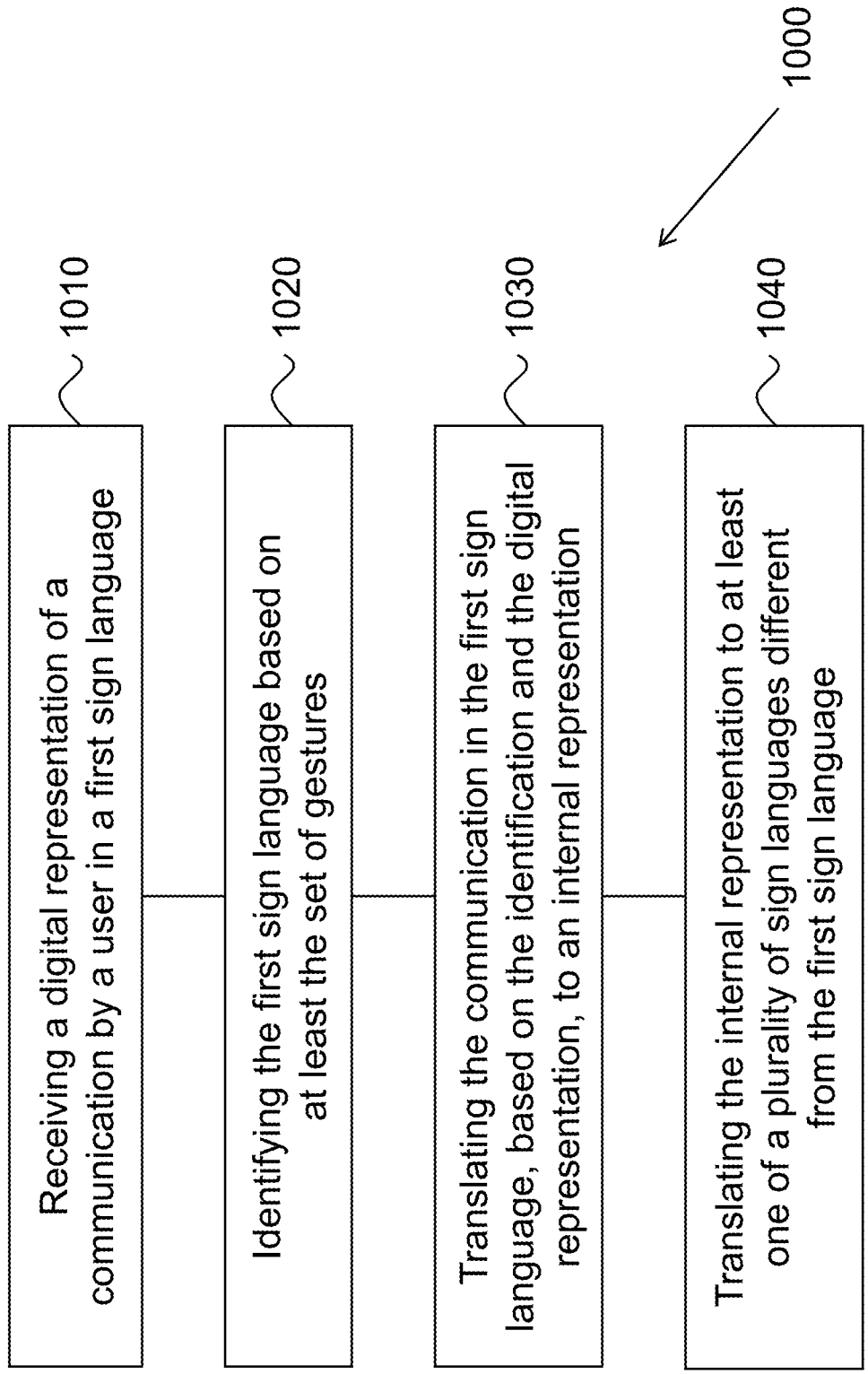
FIG. 10 illustrates a method that includes a set of operations that can be carried out to automate sign language translation in accordance with an example embodiment of the disclosed technology.

FIG. 10 illustrates a method 1000 that includes a set of operations that can be carried out to automate sign language translation in accordance with an example embodiment of the disclosed technology. The method 1000 includes, at operation 1010, receiving a digital representation of a communication by a user in a first sign language. In some embodiments, the digital representation includes a plurality of images. In other embodiments, the digital representation includes a video recording.

The method 1000 includes, at operation 1020, identifying the first sign language based on at least the set of gestures. In some embodiments, identifying the first sign language may be based on a sign language gesture library or sign language content curated by an expert. In an example, the expert content may comprise idiomatic and situational context associated with the first sign language.

The method 1000 includes, at operation 1030, translating the communication in the first sign language, based on the identification and the digital representation, to an internal representation. The method 1000 includes, at operation 1040, translating the internal representation to at least one of a plurality of sign languages different from the first sign language. In some embodiments, the translation may be based on sign language content curated by an expert. For example, and when translating known subject matter (e.g., the Bible) the expert content may be based on existing interpretation and analysis.

In some embodiments, the method may further include receiving a response to the communication, which is translated into the internal representation, and subsequently into the first sign language. Embodiments of the disclosed technology are capable of real-time operation, which is enabled, in part, by the internal representation and the underlying neural network.

As noted earlier, the example configurations in FIGS. 1-10 represent examples of systems that capture a variety of information (e.g., video, audio, still images, etc.) in different modalities (e.g., natural light, structured light, infrared light) of moving and still objects, as well as of the background environment. As a result, a large amount of data is obtained to undergo further processing and analysis to extract the information of interest. Generation and analysis of large amounts of data are hallmarks of other systems and applications, such as autonomous vehicles and medical applications that involve analysis of medical images (e.g., MRI, X-ray, CT scan, video content, etc.). Additional applications include, but are not limited to, interactive video games, airport security and surveillance applications, analysis and training for various sports, interactive home devices, and others.

In some embodiments, the example configurations in FIGS. 1-10 can include a device that supports multiple modalities in order to capture the complexities and nuances of sign language for its communication and translation.

Figure 11A:
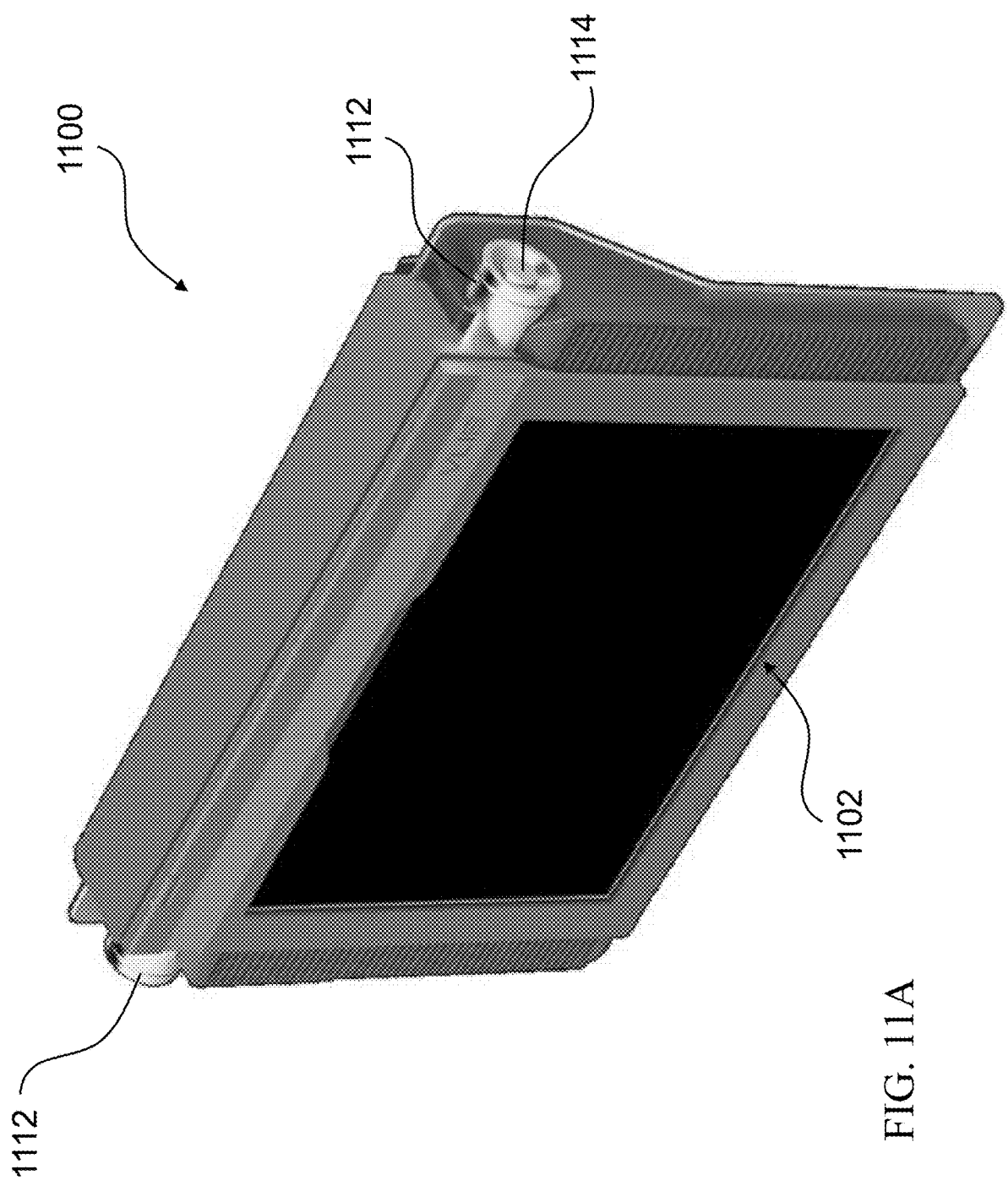
FIGS. 11A-11G illustrate another example device for sign language recognition using a device with multiple input and output modalities.

FIGS. 11A-11G illustrate yet another example device 1100 for sign language recognition using a device with multiple input and output modalities. FIG. 11A illustrates the primary display screen 1102 of the exemplary device that enables the user of the device to communicate with a signer. The device 1100 can include one or more knobs 1112 positioned proximate the top of the primary screen 1102. In some examples, the knobs 1112 can each include an axially actuated button 1114. These knobs and buttons 1112/1114 can be configured to provide functionality and control of the primary 1102 (FIG. 11A) and/or secondary 1104 (FIG. 11B) screens. For example, they can be configured to control scrolling, selecting, volume, screen brightness, playback speed and direction, and the like.

Figure 11B:
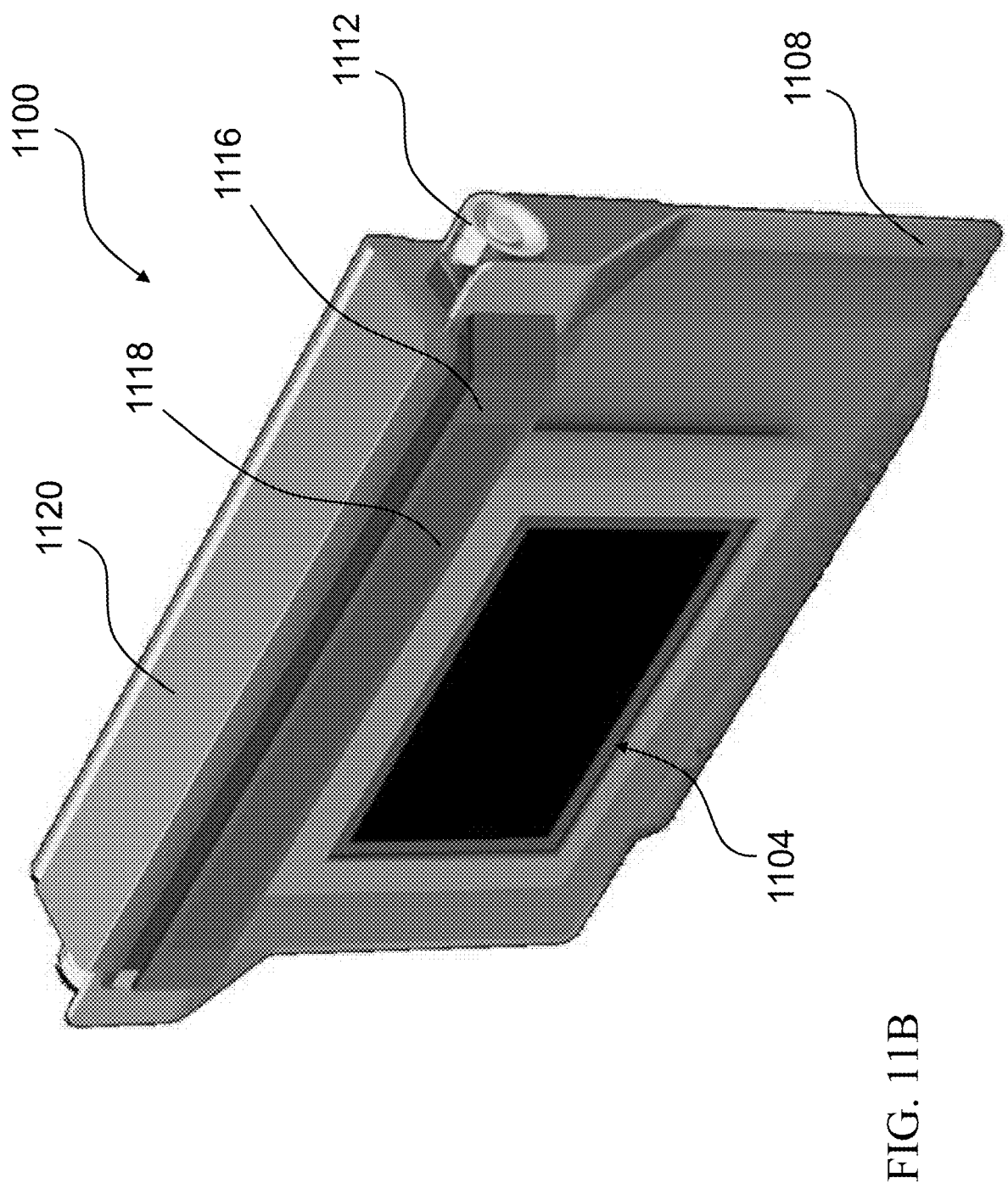

FIG. 11B illustrates the secondary display screen 1104 that faces the signer.

Accordingly, the primary and secondary screens 1102/1104 may be positioned on opposite sides of the device 1100 and face outwardly therefrom. When the device 1100 is in a folded (e.g., closed) configuration, as illustrated in e.g., FIGS. 11A and 11B, the primary display 1102 faces a first direction and the secondary display faces a second direction opposite the first direction. In some examples, the camera(s) and audio sensors 1210 (see FIG. 12) are positioned above the secondary screen 1104 in a sensor module 1116 and behind a sensor window 1118. Thus, the camera(s) and audio sensors are positioned to face the signer for recording the signer's utterings, and environmental and background sounds and images, which can be displayed or otherwise presented to the viewer through, for example, the primary display 1102. A support stand 1108 can be attached to the secondary screen 1104 and sensor module 1116 via an upper frame member 1120. In some examples, the knobs 1112 can be mounted to the upper frame member 1120.

Figure 11C:
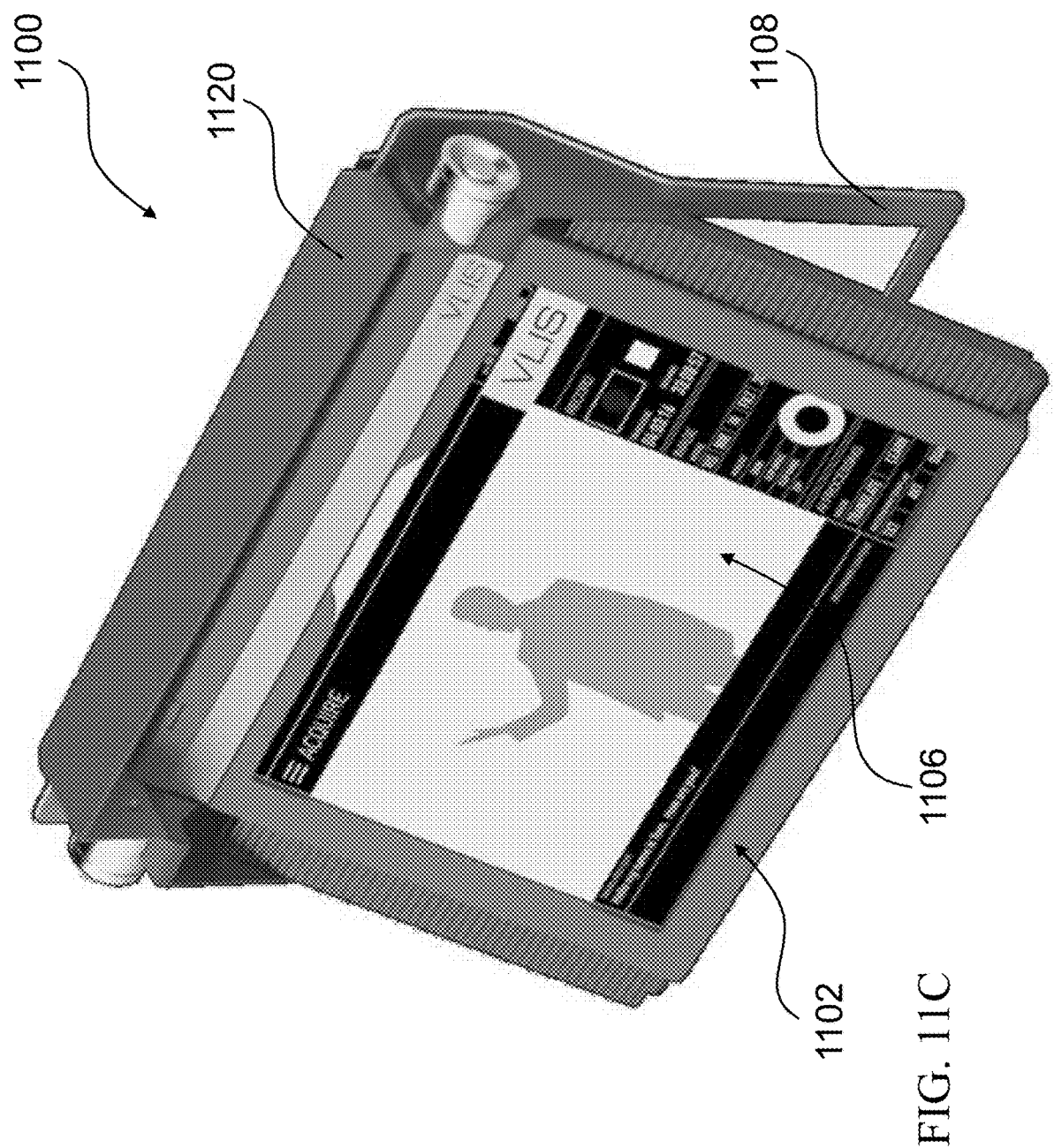
Figure 11D:
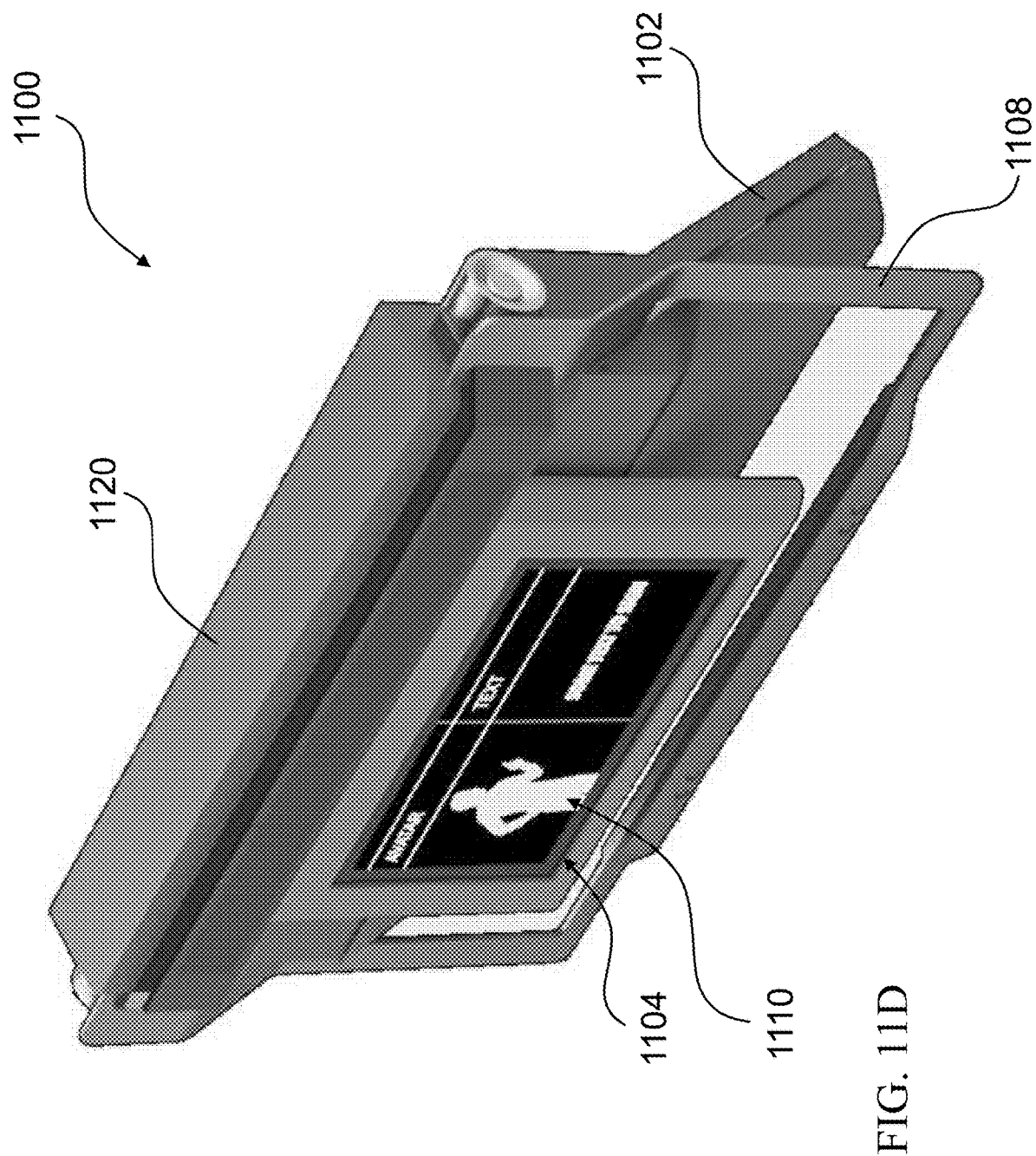

FIGS. 11C and 11D illustrate the device 1100 in an unfolded (e.g., open or partially open) configuration, which allows the device 1100 to be placed on a flat surface using the stand 1108. The primary screen 1102 slides down and folds or pivots away from the stand 1108 such that the primary screen 1102 is angled relative to the stand 1108, secondary screen 1104, and upper frame member 1120. Thus, in the unfolded configuration, the device 1100 rests on the bottom of the primary screen 1102 (or the bottom portion of a frame or a cover that accommodates the primary screen 1102) and the stand 1108. FIG. 11C further illustrates an example user interface 1106 on the primary screen 1102 of the device 1100 and FIG. 11D illustrates the corresponding user interface 1110 on the secondary screen 1104 facing the signer.

Figure 11E:
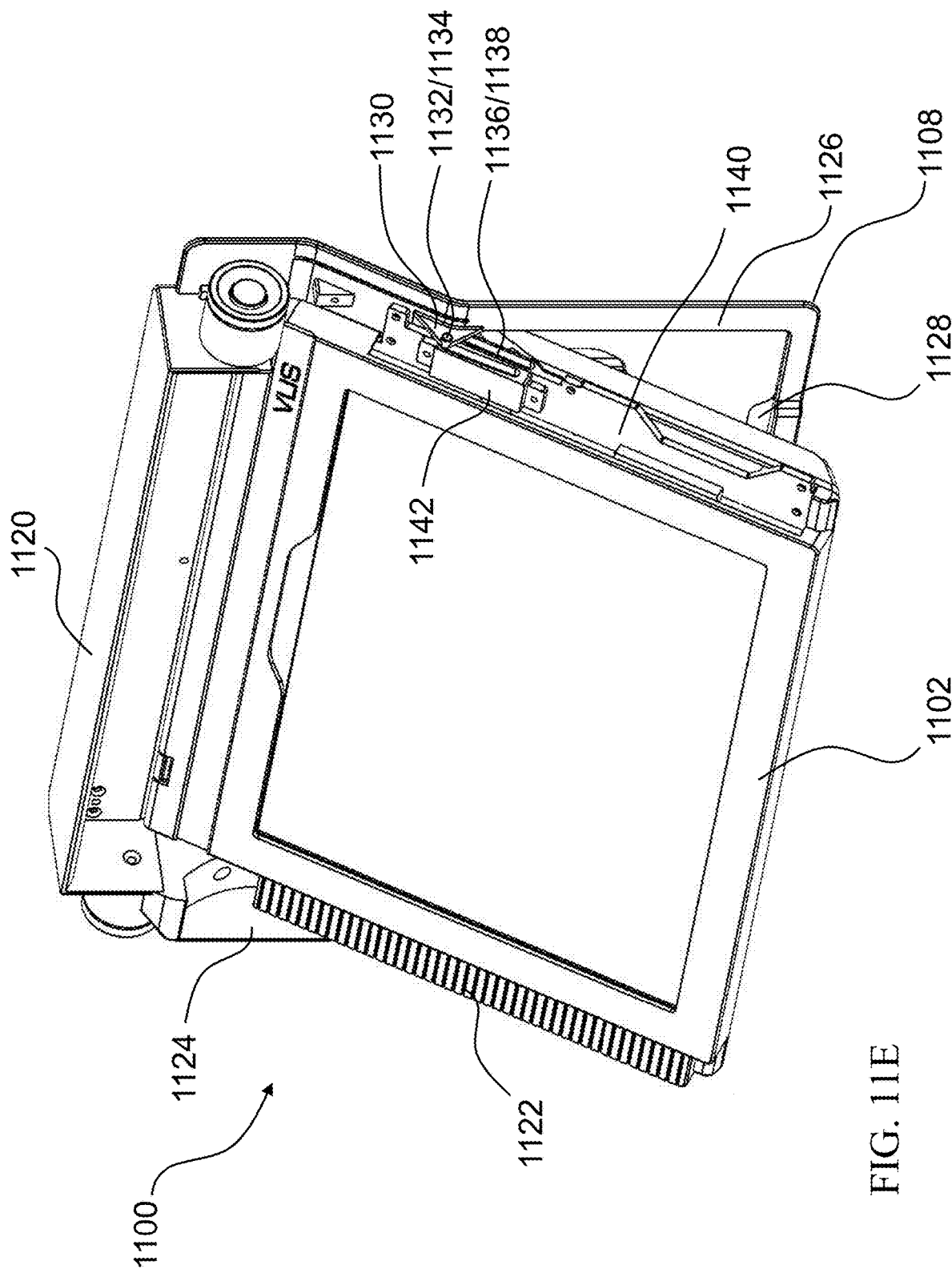
Figures 11F, 11G:
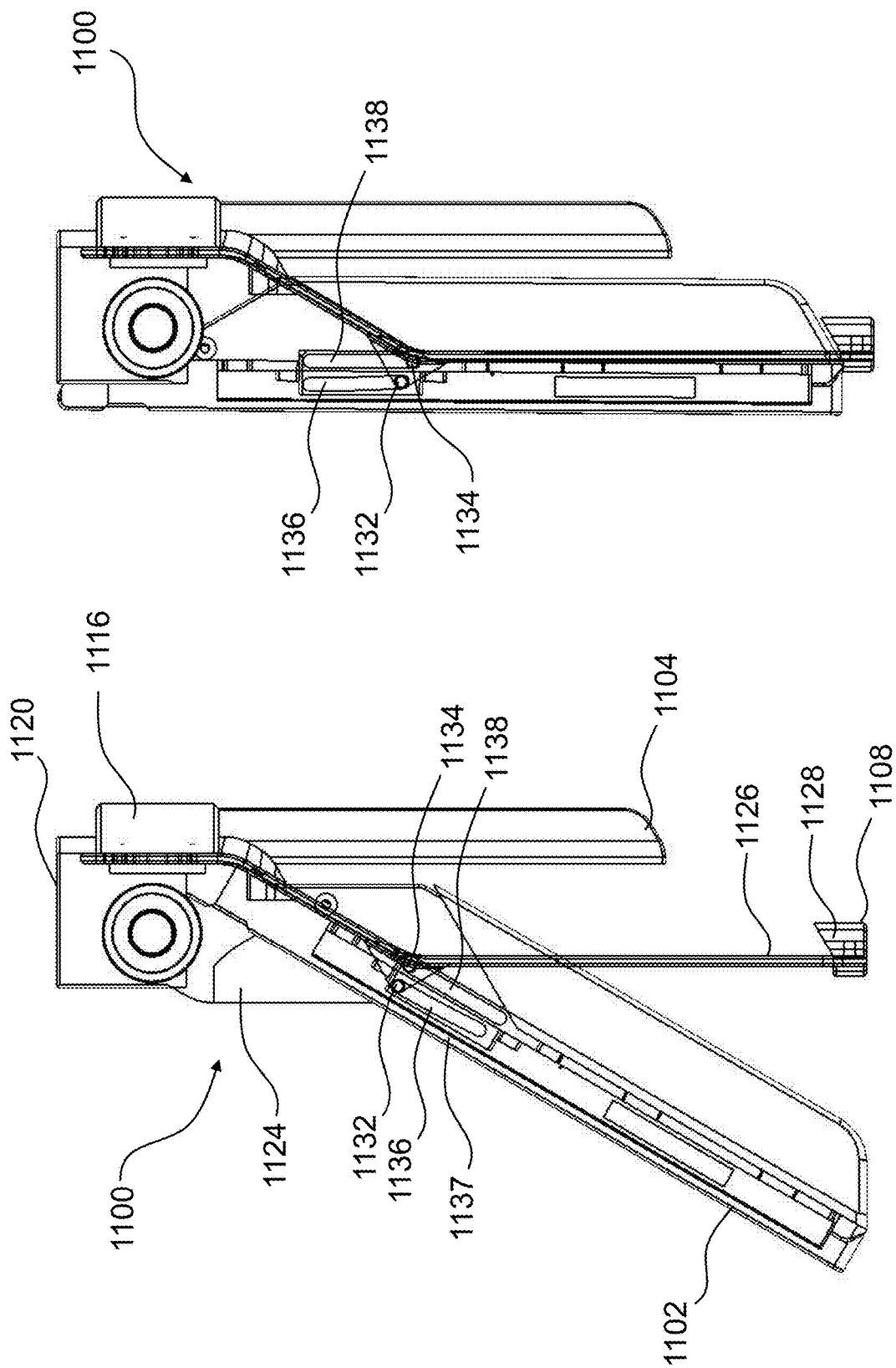

FIGS. 11E-11G illustrate the sign language recognition device 1100 with side covers 1122 and 1124 removed on one side to illustrate the sliding/pivoting mechanism. As illustrated in FIG. 11E, the primary display 1102 is slideably and pivotably coupled to the secondary display 1104 via the support stand 1108. In some examples, the support stand 1108 can comprise a pair of support arms 1126 each attached to the upper frame member 1120 at a first end and to a transverse support member 1128 at a second end. Each support arm 1126 can include a tab 1130 projecting away from the arm to carry a pair of pivot/slide features, such as pins 1132/1134, to control the sliding and pivoting motion of the primary display 1102. These pins 1132/1134 engage corresponding grooves 1136/1138 formed, respectively, in a groove block 1142 and a display mount 1140. Although the examples herein are described with respect to pins and grooves, other suitable cooperative moving features, and specifically other types of pivoting/sliding features can be used, such as bearings, ramped or cam surfaces, wheels, linkages, and the like. In some examples, the pins and grooves can be switched such that the grooves are carried by the support arms and the pins are located on the display mount.

FIGS. 11F and 11G both illustrate the support arm 1126 as being transparent to better illustrate the pins 1132/1134 and corresponding grooves 1136/1138. The grooves 1136/1138 are generally parallel to each other. However, groove 1138 is longer than groove 1136 and groove 1136 includes an arcuate portion 1137 (FIG. 11F). In some examples, the groove 1136 can be a straight groove that is angled with respect to groove 1138. As the primary screen 1102 is slid toward the upper frame member 1120, the pins 1132 and 1134 slide in their respective grooves 1136 and 1138. As the pins approach the end of their travel in the grooves, pin 1132 is forced closer to groove 1138 due to the arcuate portion 1137. In other words the grooves 1136/1138 converge at one end. This encourages the primary display 1102 to pivot with respect to the pins. The extended length of groove 1138 allows the primary display to fully pivot and toggle (e.g., lock) into the closed configuration as illustrated in FIG. 11G. It should be appreciated that one or more of the groove block 1142 and display mount 1140 (FIG. 11E) can be formed from a resilient material such as plastic, whereby detents can be formed at the opposite ends of the grooves to help hold the display in the folded and/or unfolded configurations.

Figure 12:
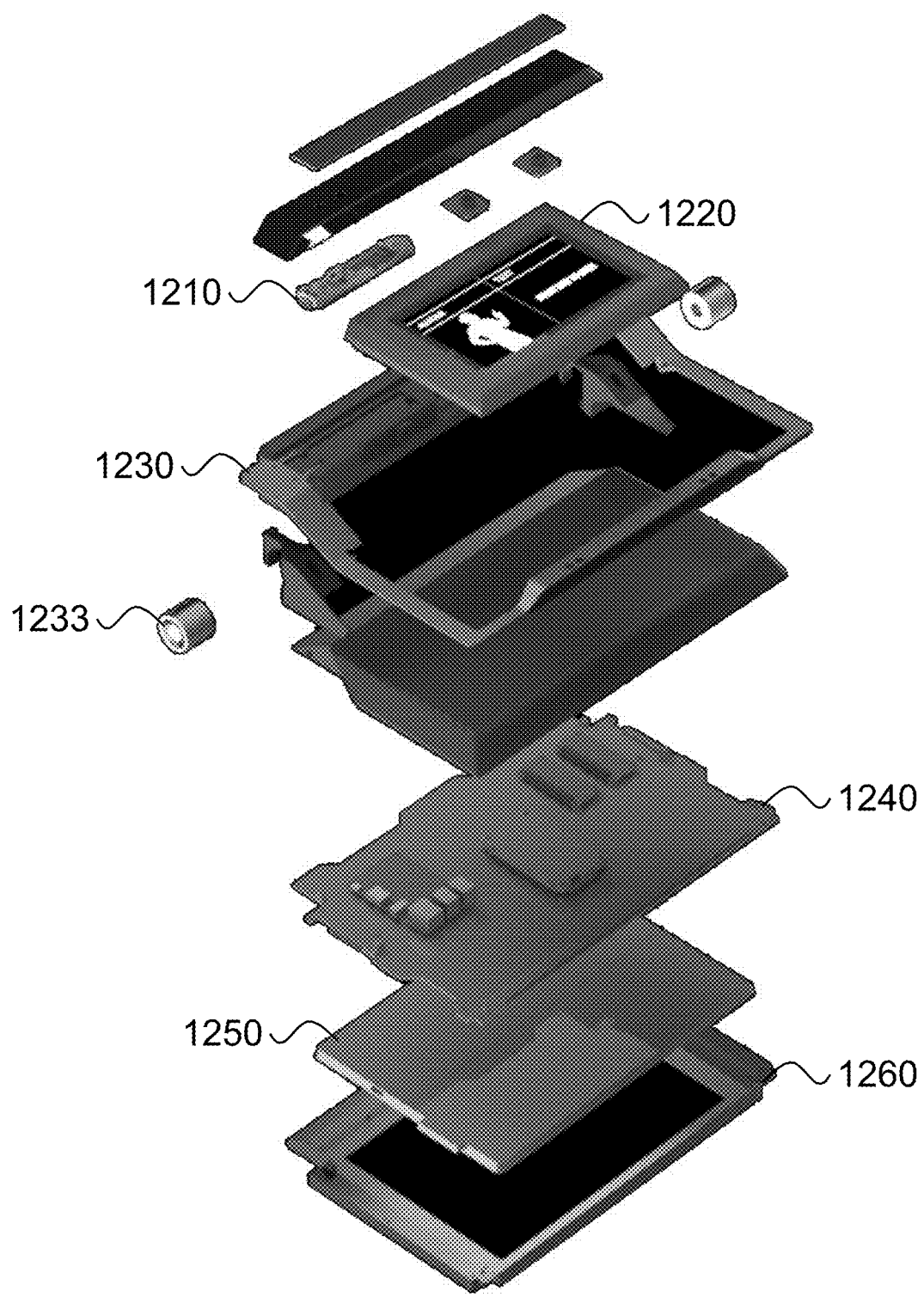
FIG. 12 illustrates an exploded view of the yet another example device for sign language recognition using a device with multiple input and output modalities.

FIG. 12 illustrates an exploded view of yet another example device for sign language recognition using a device with multiple input and output modalities. As illustrated therein, the device includes a 3D camera and dedicated hardware video and audio sensors 1210, a secondary screen for multi-modal communication with sign language speakers 1220, a slide-out stand and dedicated hardware controls for tabletop or tripod use 1230, a multi-stage, dedicated hardware AI pipeline with multiple ARM cores and capable of on-board real-time processing 1240, a purpose-built user interface for sign language translation capable to simultaneous multi-modal interaction 1250, and a primary screen 1260.

In an example, the knob 1233 is mechanically used to provide a pivot for the slide-out stand. However, in some embodiments, the knob may be configured to provide functionality for the user of the primary screen. In an example, it may be configured to enable scrolling through information or logs on the primary screen. In another example, it may be configured to assist in playback (to fast-forward or rewind the video being played).

As described above, using multiple apertures increases fidelity so as to enable the high-quality reproduction of the movement. This allows additional information for each pixel to be captured, which can be used to create unique feature signatures for the different movements of the sign language. The features may be leveraged to identify the movements in the subsequent processing stage. In an example, a feature signature may be the right hand of the subject moving horizontally within a particular 3D volume in a particular amount of time. Features such as these, in combination with other sign language movements and the subject's emotions, may be mapped onto an interpretation of the sign language.

For example, the feature signatures from each of these different modalities may be combined through a point-cloud model, or a multi-camera, or multi-frame 3D model construction algorithms or artificial intelligence (e.g., DNNs, CNNs) programs, which enables more accurate and robust recognition. As expected, increasing the number of feature signatures used results in an increase in the training set as well as the recognition network. In general, the more unique/differentiated information is captured, the greater the accuracy (in statistical terms) of distinguishing one feature from another. The use of multiple apertures increases the amount of non-redundant data that is captured by the system.

FIGS. 13-33 illustrate various features of a user interface (UI) in accordance with an example embodiment of the disclosed technology. The UI can be displayed on a primary display, such as primary display 1102 (e.g., FIG. 11E) or primary screen 1260 (FIG. 12). The UI can be organized as a use case task order flow or order of operations. In some embodiments, the UI can include, for example, an Acquire page, an Edit page, a Translate page, a Review page, and a Publish page. Each of these pages or screens can have the same basic layout.

Figure 13:
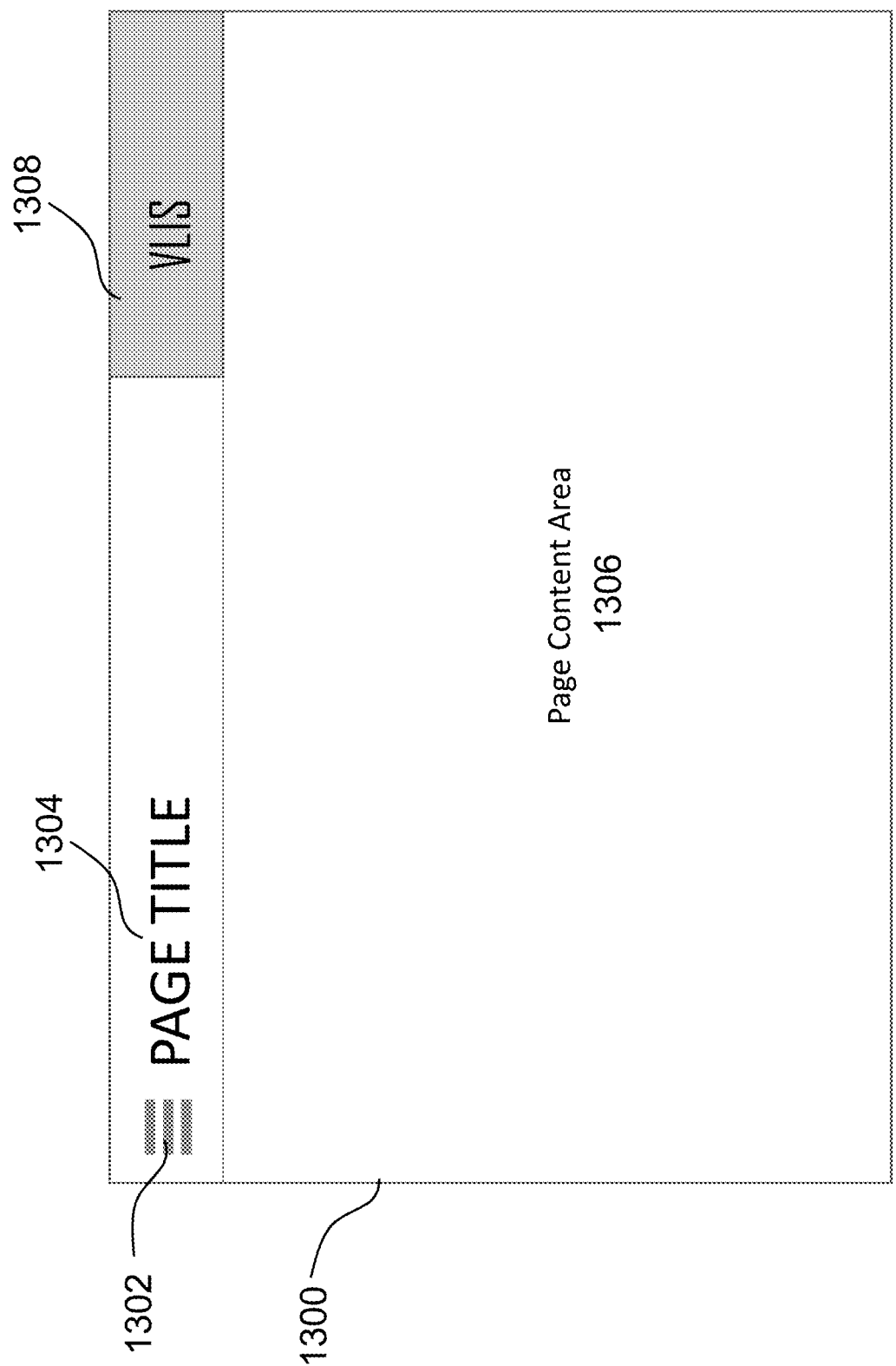
FIG. 13 illustrates a basic user interface screen in accordance with an example embodiment of the disclosed technology.

FIG. 13 illustrates a basic user interface screen 1300 showing some features that are common to all of the UI pages. For example, the basic screen 1300 can include a menu button 1302, a page title 1304, a page content area 1306, and a logo/status/notification area 1308.

Figure 14:
FIG. 14 illustrates a user interface menu.

FIG. 14 illustrates a user interface menu 1310 accessible by selecting the menu button 1302 (FIG. 13). In some embodiments, the interface menu 1310 can include: Acquire, Edit, Translate, Review, Publish, Viewer, Reader, Help, and Settings selection options, for example. Selection of one of the selection options will display a user interface page for that option. The page content area 1306 can be obscured or blurred during menu selection. Selection of various screen contents (e.g., menu button 1302) can be accomplished with a mouse, touch screen control, voice command, and/or knobs and buttons 1112/1114 (FIG. 11A). For example, one of the knobs 1112 can be used to scroll through the interface menu options 1310 and the desired selection can be made by pushing one of the buttons 1114.

Figure 15:
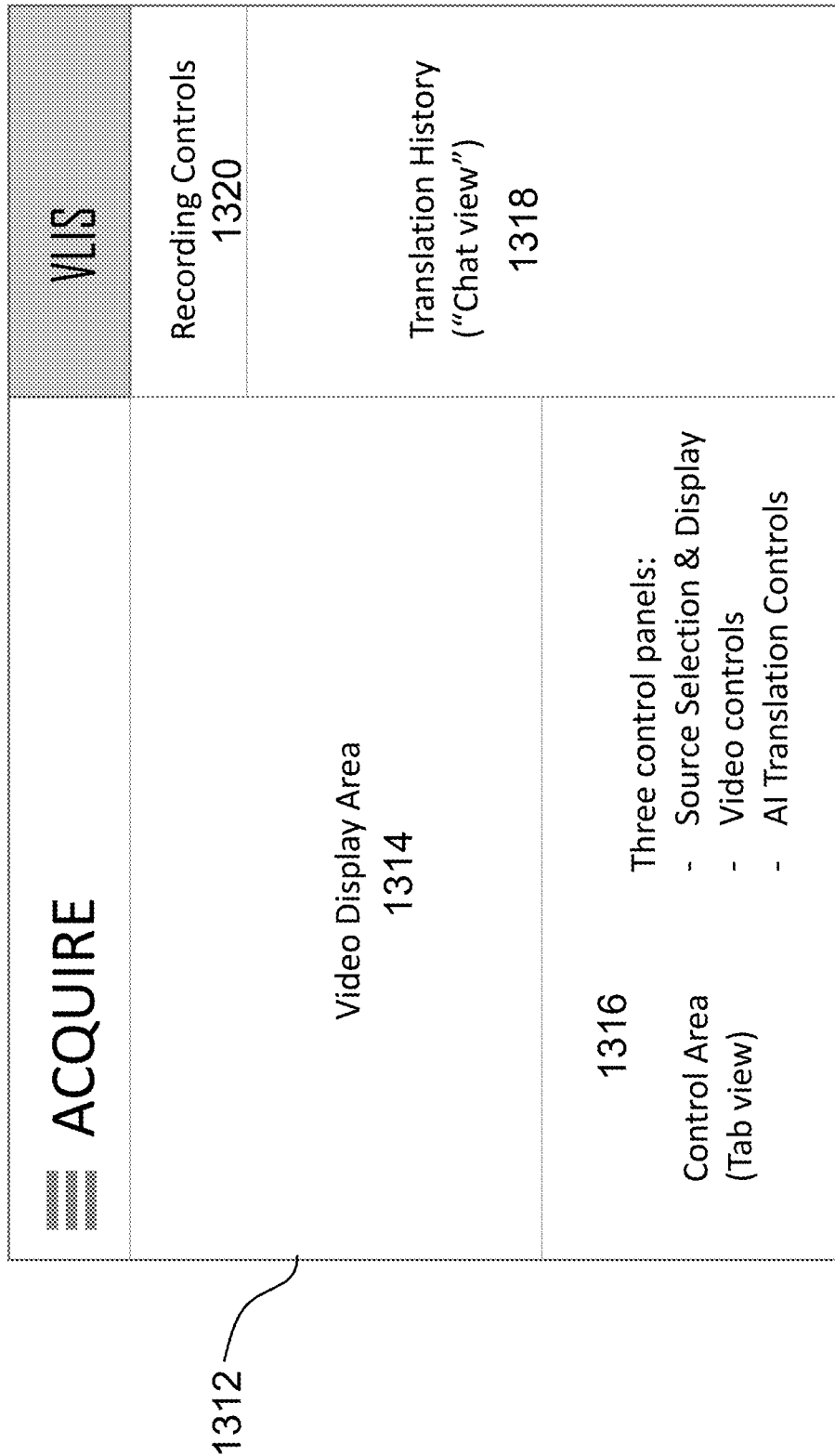
FIG. 15 illustrates a user interface for acquiring translation source content.

FIG. 15 illustrates a user interface Acquire page 1312 for acquiring translation content. The Acquire page 1312 can display translation source content, record video content, and provide an initial display of a translation of the video content. The page content area of the Acquire page 1312 can be divided into a video display area 1314, a control area 1316, a translation history area 1318, and recording controls area 1320. The video display area 1314 can display video of the SL speaker (i.e., signer), an avatar of the SL speaker, text version of the translated text, and/or system status. The control area 1316 can be configured as a tab view for selecting between multiple control panels, such as source selection and display, video controls, and AI translation controls. The translation history area 1318 can display a history of the translated text and/or conversations between the SL speaker and the system user. The translation history area 1318 can be configured as a "chat" view. The recording controls area 1320 can include recording control buttons (e.g., record and pause) along with video timecodes and total time displays. In some embodiments, one of the knobs 1112 can be used to scroll through the various available sources to be translated and/or scroll through the translation history. An example of a user interface interaction of a translation/recording session using the Acquire page 1312 is further described below with respect to FIGS. 22-33.

Figure 16:
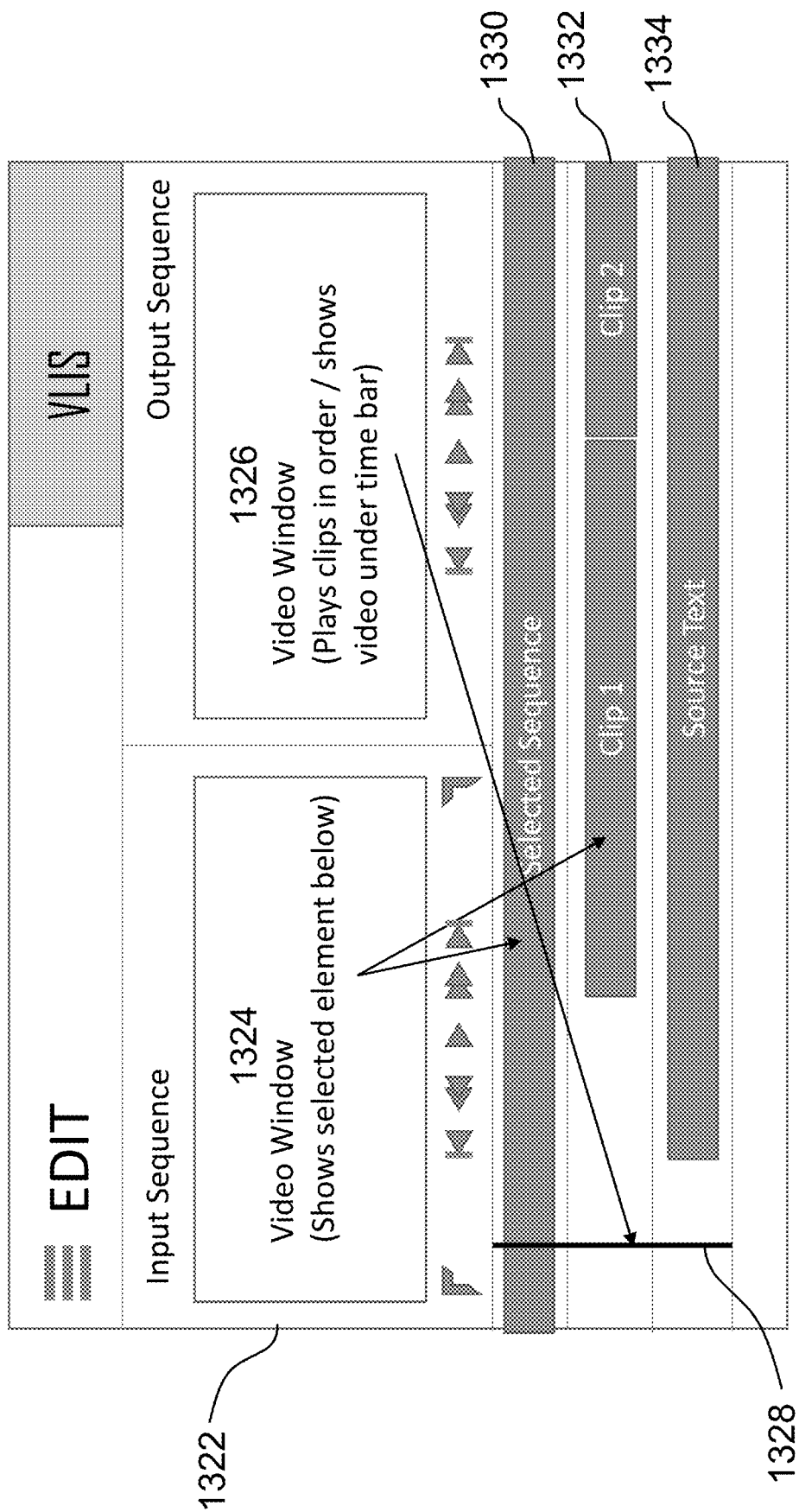
FIG. 16 illustrates a user interface for video editing of recorded content.
Figure 17:
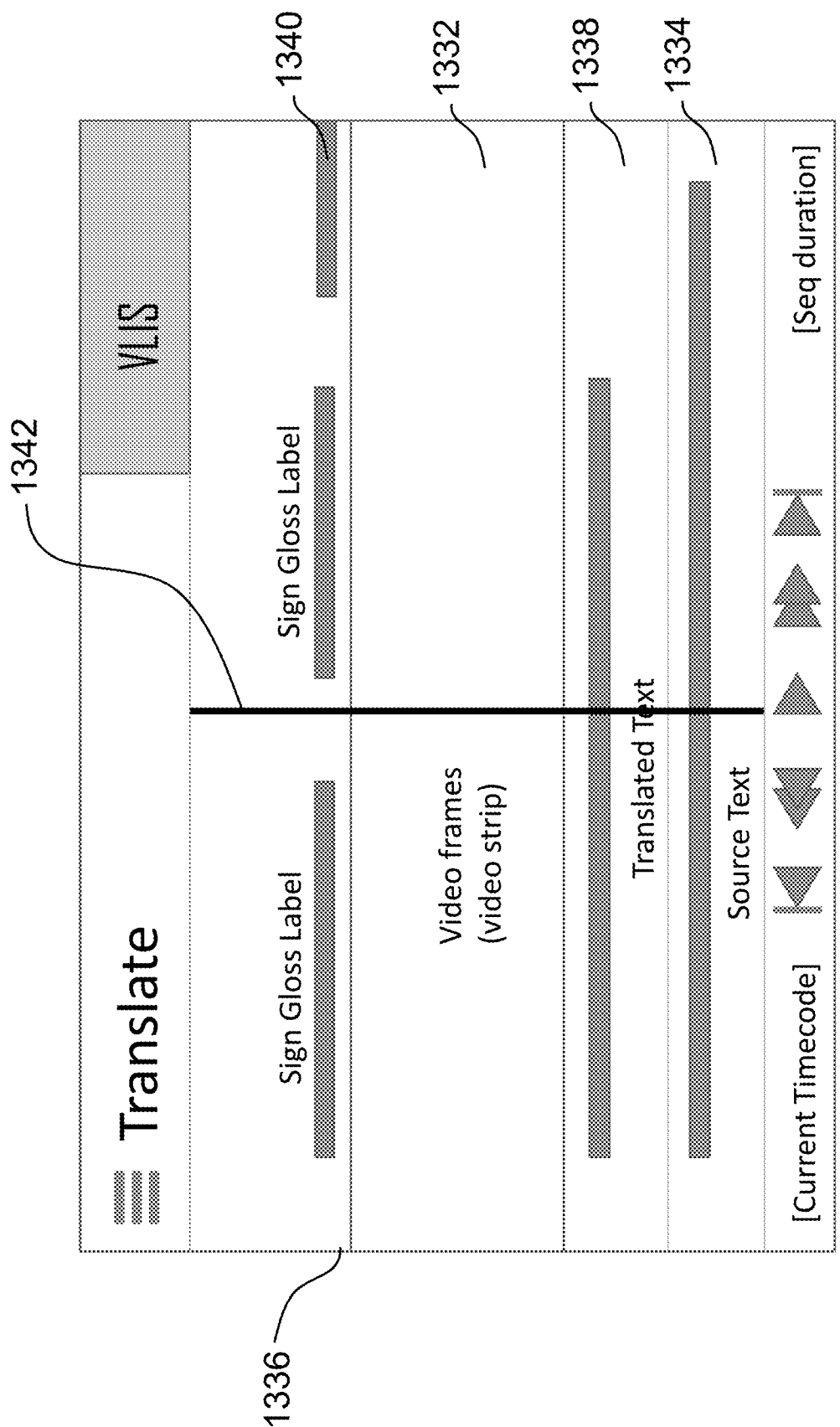
FIG. 17 illustrates a user interface for translating content.

FIG. 16 illustrates a user interface Edit page 1322 for video editing of recorded content (e.g., clips) to include in a final video sequence. An input sequence video window 1324 can be used to mark in/out crops on recorded video sequence(s) 1330 (i.e., source(s)), creating clips which are then arranged in the output track 1332. Source text 1334 corresponds to the clips arranged in the output track 1332. An output sequence video window 1326 plays clips in order and renders to a single output track 1332 used for translation on a Translate page 1336 (FIG. 17). Horizontal scrolling of the track interface is accomplished with a sliding time bar 1328. In some embodiments, the sliding time bar 1328 can be controlled with one or the other of knobs 1112.

FIG. 17 illustrates a user interface Translate page 1336 for translating and editing the content. The source text 1334 and video output track 1332 (e.g., video frames or strip) are displayed with a translation 1338 of the source text as well as a translation into sign gloss 1340. A sign gloss is a transcription of a sign transcription including various notations to account for the facial and body grammar that goes with the signs. Clicking or tapping the source text 1334, the translation 1338, or sign gloss 1340 allows editing of those contents. Each of the source text 1334, the translation 1338, or sign gloss 1340 can be displayed as timeline bars. Dragging the handles on the time line bars can change the association between video (timestamps) and other elements. In contrast to the sliding time bar 1328 of the Edit page 1322, the Translate page 1336 can use a fixed time bar 1342 whereby e.g., horizontal finger movement on the video strip 1332 or other lanes (i.e., source text 1334, translation 1338, and sign gloss 1340) scrubs all of the lanes left or right. In some embodiments, scrubbing the video strip 1332 and other lanes can be controlled with one or the other of knobs 1112.

Figure 18:
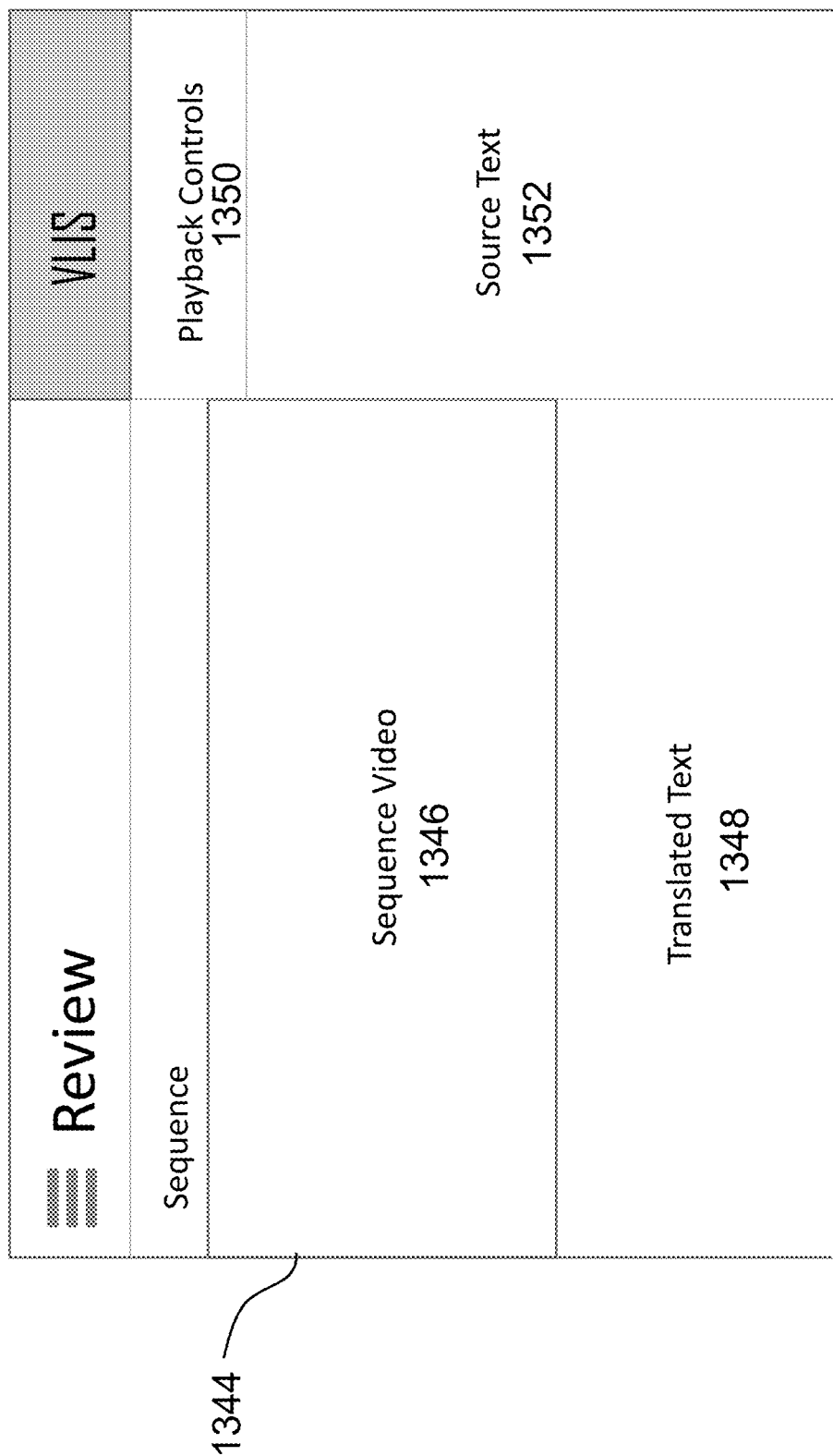
FIG. 18 illustrates a user interface for playback of video and translation content.

FIG. 18 illustrates a user interface Review page 1344 for playback of video content and any available translation content. The page content area of the Review page 1344 can be divided into a sequence video area 1346, a translated text area 1348, a playback controls area 1350, and a source text area 1352. The sequence video area 1346 can display video from the video output track 1332. The source text area 1352 can display the source text and the translated text area 1348 can display the translation.

Figure 19:
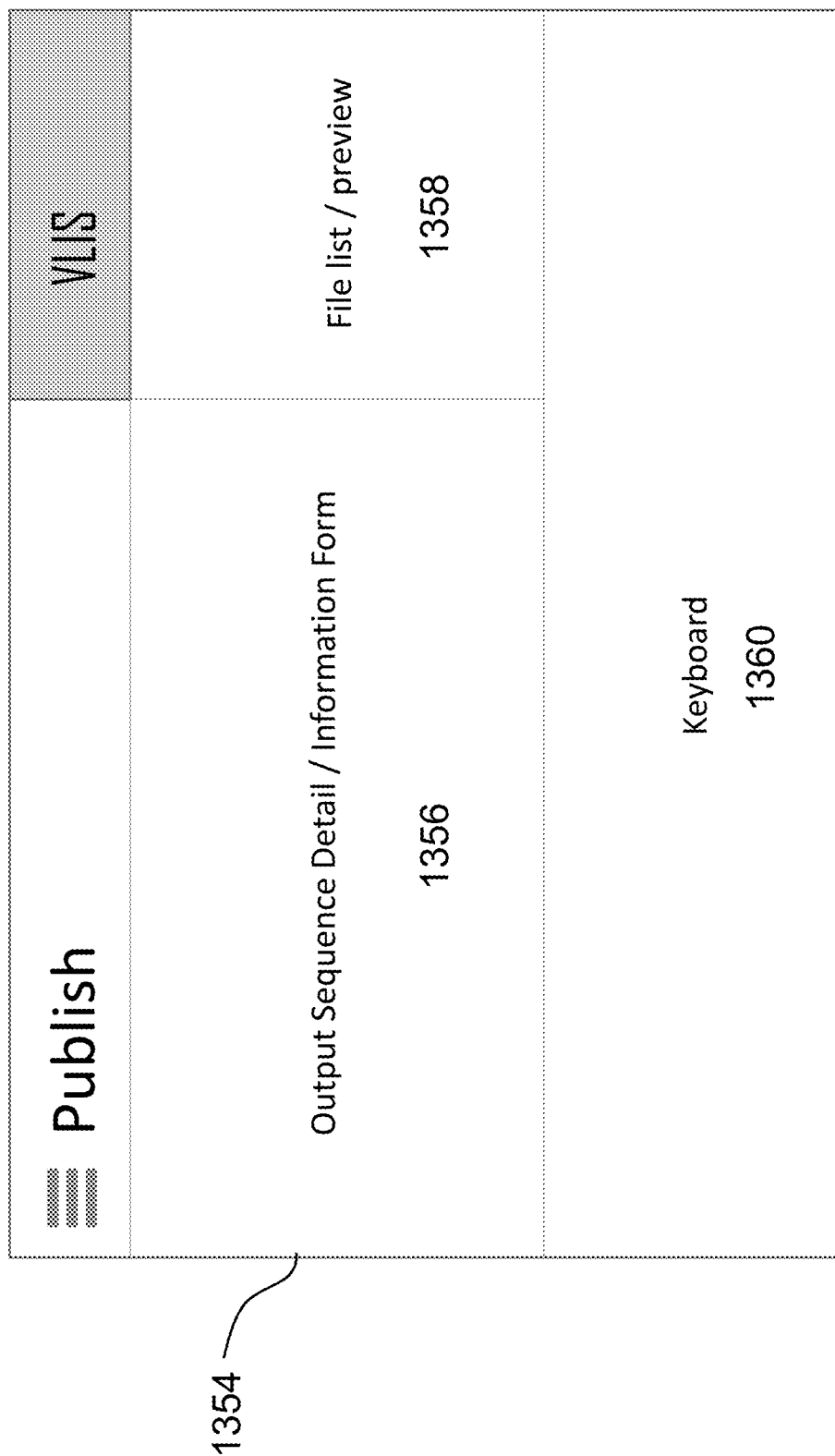
FIG. 19 illustrates a user interface for publishing video content to a server.

FIG. 19 illustrates a user interface Publish page 1354 for uploading and publishing video content to a server. The page content area of the Publish page 1354 can be divided into an Output sequence detail/information form area 1356, a file list/preview area 1358, and a keyboard 1360. In some embodiments, scrolling through the file list 1358 can be controlled with one or the other of knobs 1112.

Figure 20:
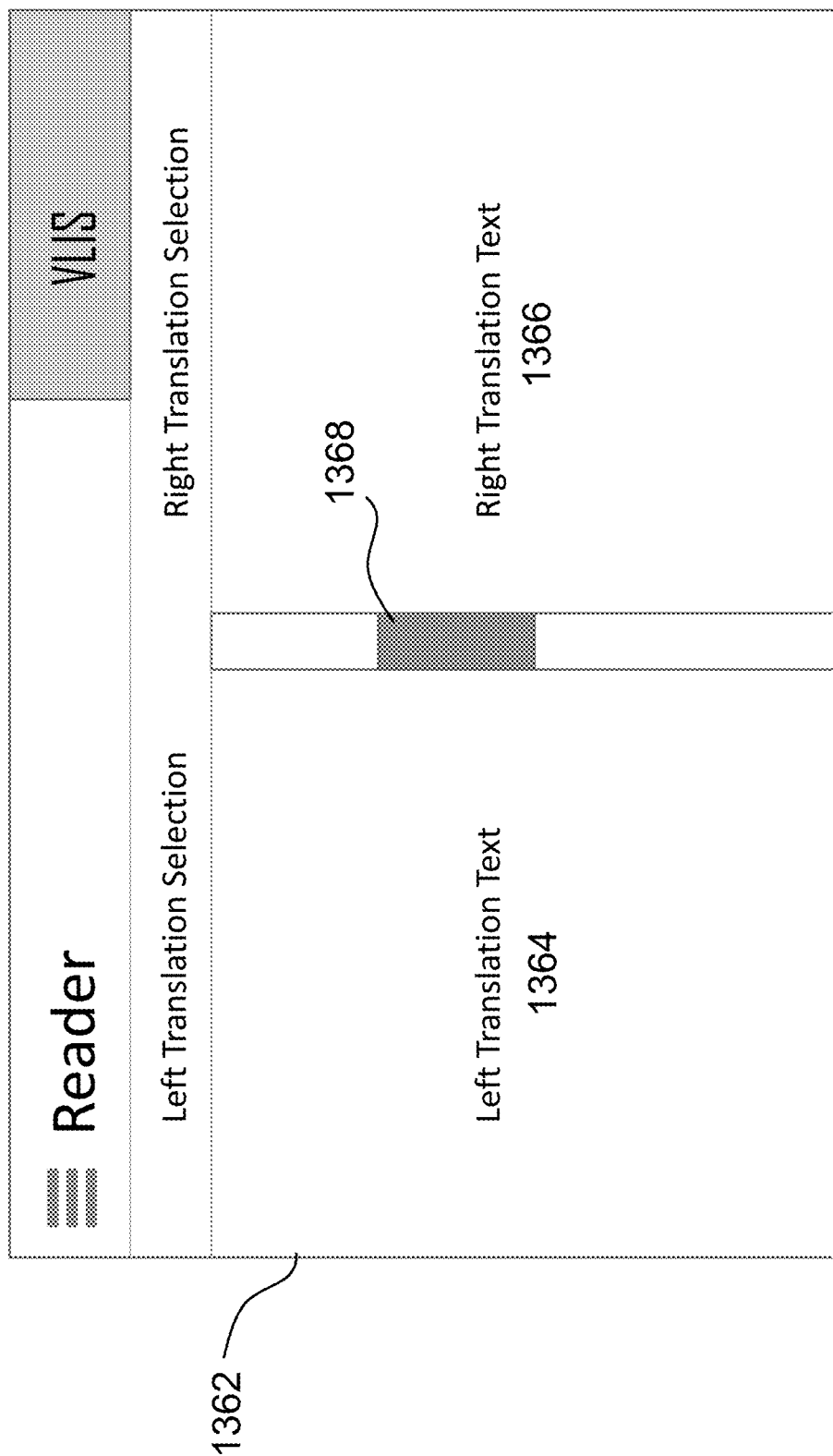
FIG. 20 illustrates a user interface for reading translation text.

FIG. 20 illustrates a user interface Reader page 1362 for reading translation text. The page content area of the Reader page 1362 can be divided into a left translation text area 1364 and right translation text area 1366. A common scrollbar 1368 (i.e., both views scroll together) can be used to scroll through the translations. For example, the left and right translation text can be selected from any available language, e.g., left translation language can be English and the right translation language can be Spanish. In some embodiments, the common scrollbar 1368 can be controlled with one or the other of knobs 1112.

Figure 21:
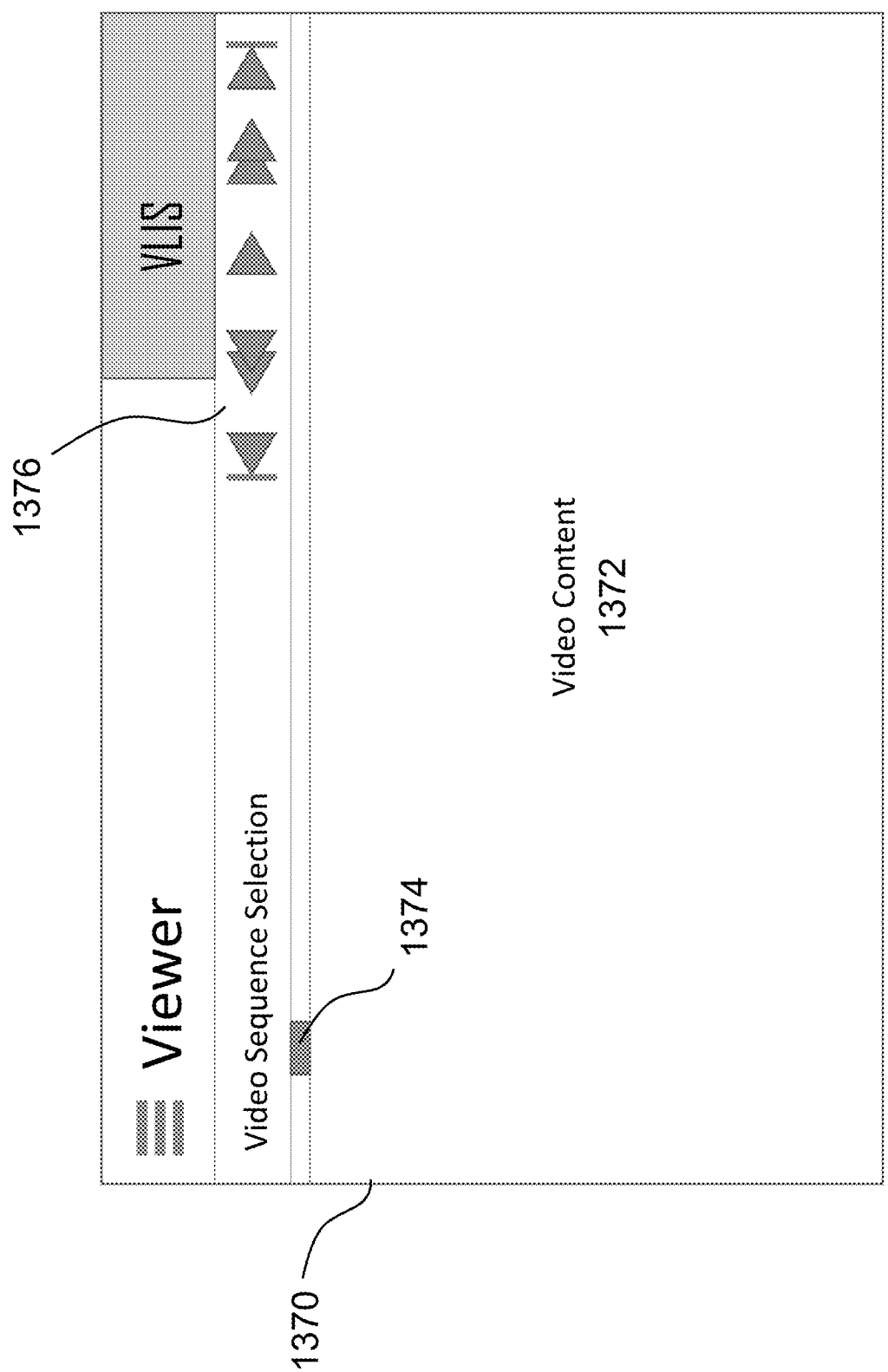
FIG. 21 illustrates a user interface for viewing video content.

FIG. 21 illustrates a user interface Viewer page 1370 for viewing video content. The page content area of the Viewer page 1370 can be divided into a video content area 1372 and playback controls 1376. A horizontal progress scrub bar 1374 can be used to navigate through the video playback. In some embodiments, one or the other of knobs 1112 can be used to navigate (e.g., control scrub bar 1374) through the video.

FIGS. 22-33 illustrate an example user interface interaction of an acquisition process to record and translate video content using an Acquire page 1412 similar to that described above with respect to FIG. 15. The process is described from the perspective of a primary user e.g., a consultant directing the recording process to acquire SL translation of textual scripture, for example. In this example, the primary user is viewing the primary display screen 1102 (FIG. 11A) and a subject, e.g., SL speaker, is viewing the secondary display screen 1104 (FIG. 11B) and signing text for recorded video, via the cameras, to compile a complete SL translation.

Figure 22:
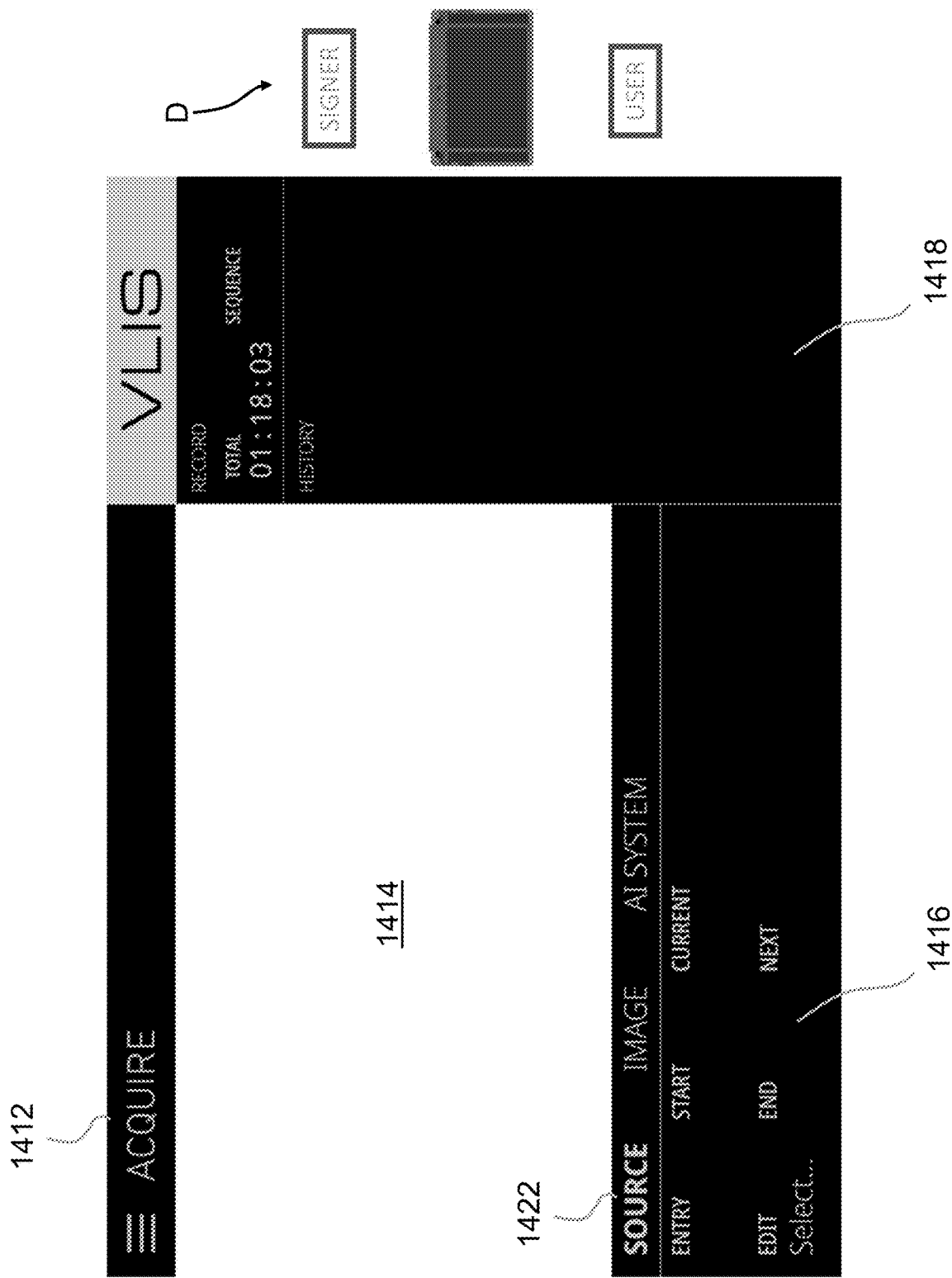
FIGS. 22-33 illustrate an example user interface interaction of a translation and recording session.

With initial reference to FIG. 22, a diagram D illustrating the flow and mode of information between the user and the signer is provided to the right of the Acquire page 1412 in each of FIGS. 22-33 in order to aid the reader's understanding of the function of the Acquire page 1412 and the associated content acquisition process. These diagrams do not form a part of the user interface in the depicted embodiment. However, in other embodiments, such diagrams can be incorporated into the user interface.

After opening or starting a new project, the project session begins with a blank video display area 1414—the user has not yet selected a text to work with, and the system has not initialized any video sequence storage. The translation history area 1418 is also blank or empty at this point. In the depicted embodiment, the control area 1416 is configured as a tab view for selecting between Source, Image, and AI System.

Figure 23:
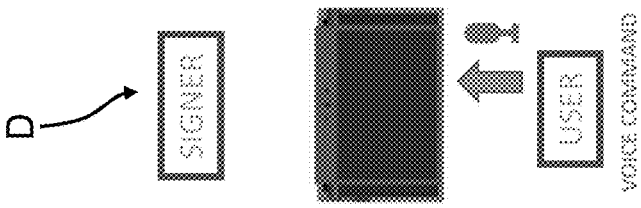

The Source tab 1422 is selected and "Edit" "Select . . . " is selected to open a Source window 1424 as shown in FIG. 23. The user selects John 3:9 of the English ASV from the list as the starting point for the source text. This selection can be accomplished with a voice command (as indicated in diagram D), but can also be accomplished via the touch screen or a pointing device, for example.

Figure 24:
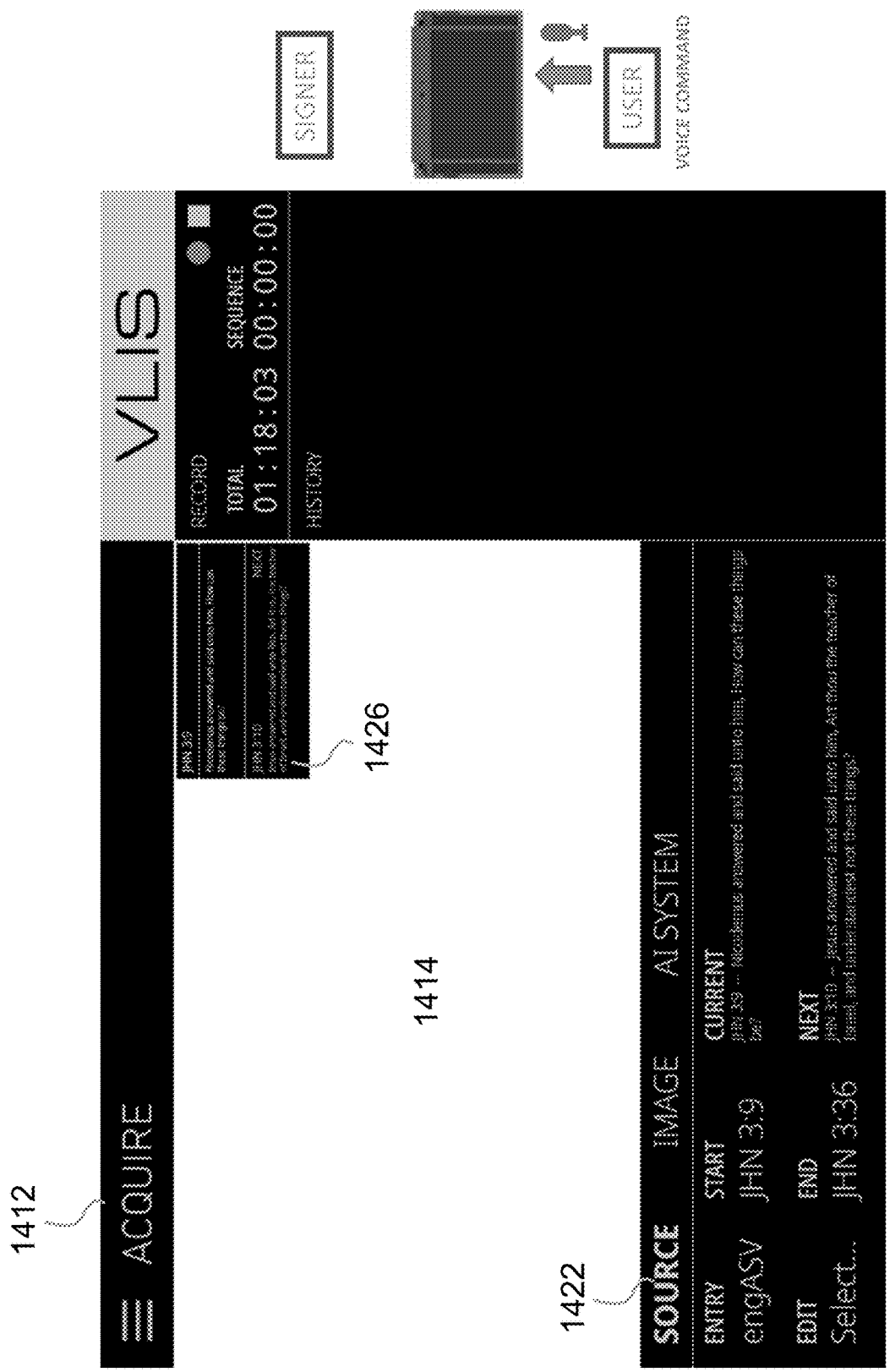

As shown in FIG. 24, the system is now ready to record a video sequence. The Source tab 1422 indicates the text selection Start and End points. The tab also indicates the Current and upcoming (i.e., Next) text selections to be translated. In some embodiments, the video display area 1414 includes a Picture-in-picture (PIP) display 1426 of the video being output to the signer-facing screen 1104 (FIG. 11B).

Figure 25:
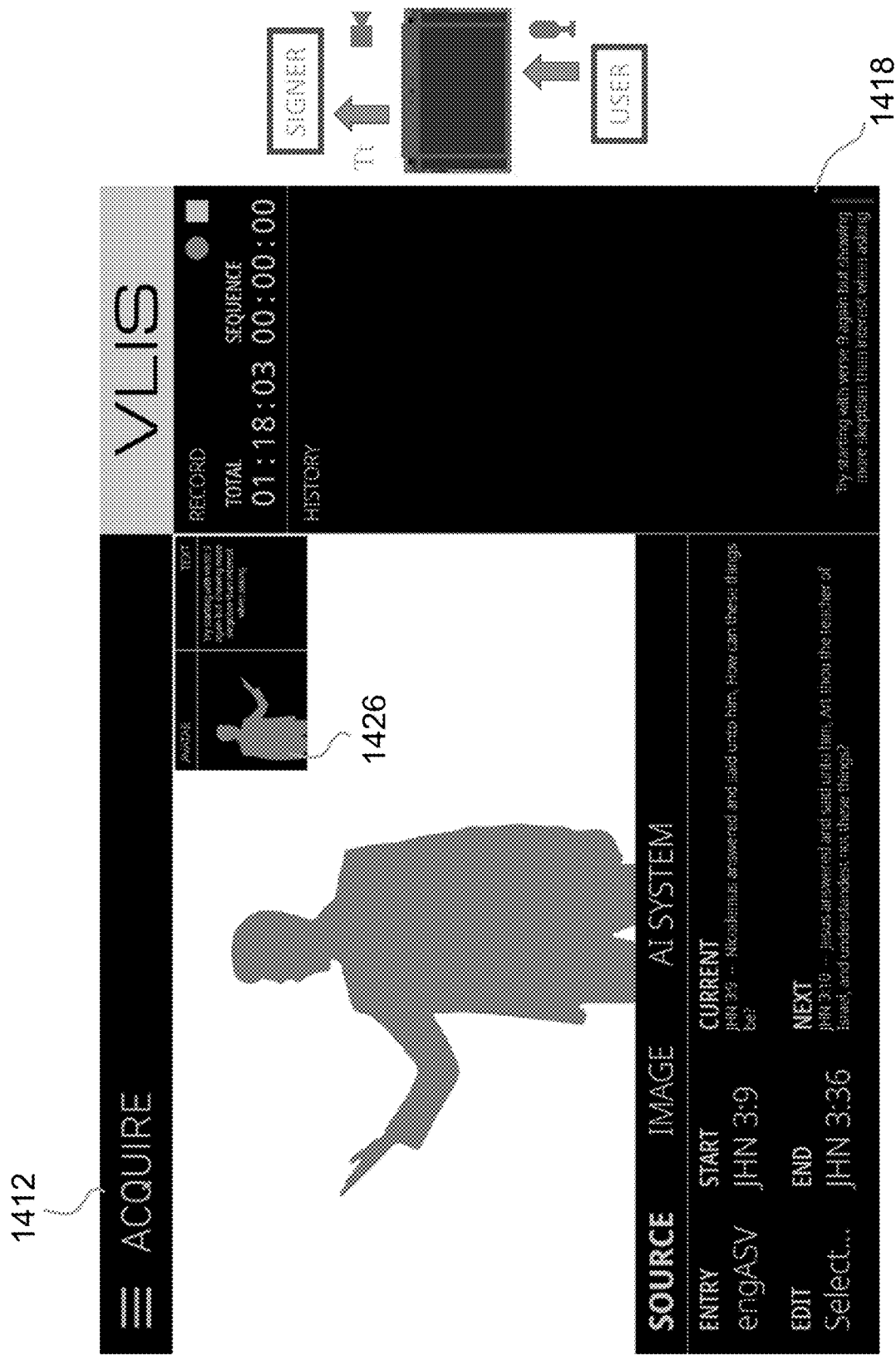

With reference to FIG. 25, the Acquire page 1412 can not only record an SL translation of a selected source text, but can also include real-time or near real-time two-way translation between the primary user and the signer for the purpose of communication/collaboration between the primary user and the signer. For example, as shown in translation history area 1418, the user prompts the SL speaker to begin at verse 9 with a slightly different "tone" than a previous session. The system translates the user's spoken audio to text and SL avatar video which is displayed on the signer-facing screen 1104 (FIG. 11B) and in the PIP 1426.

Figure 26:
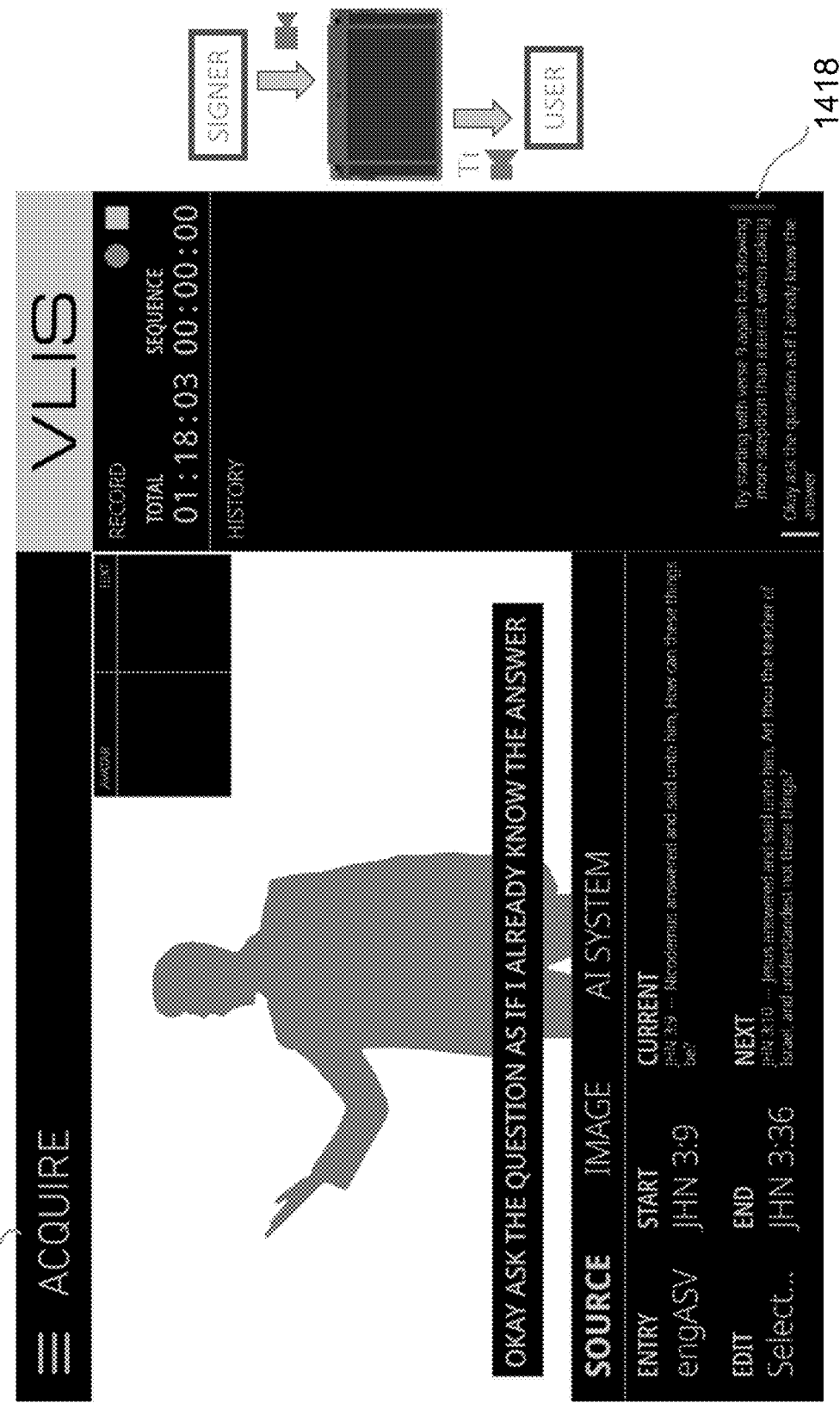
Figure 27:
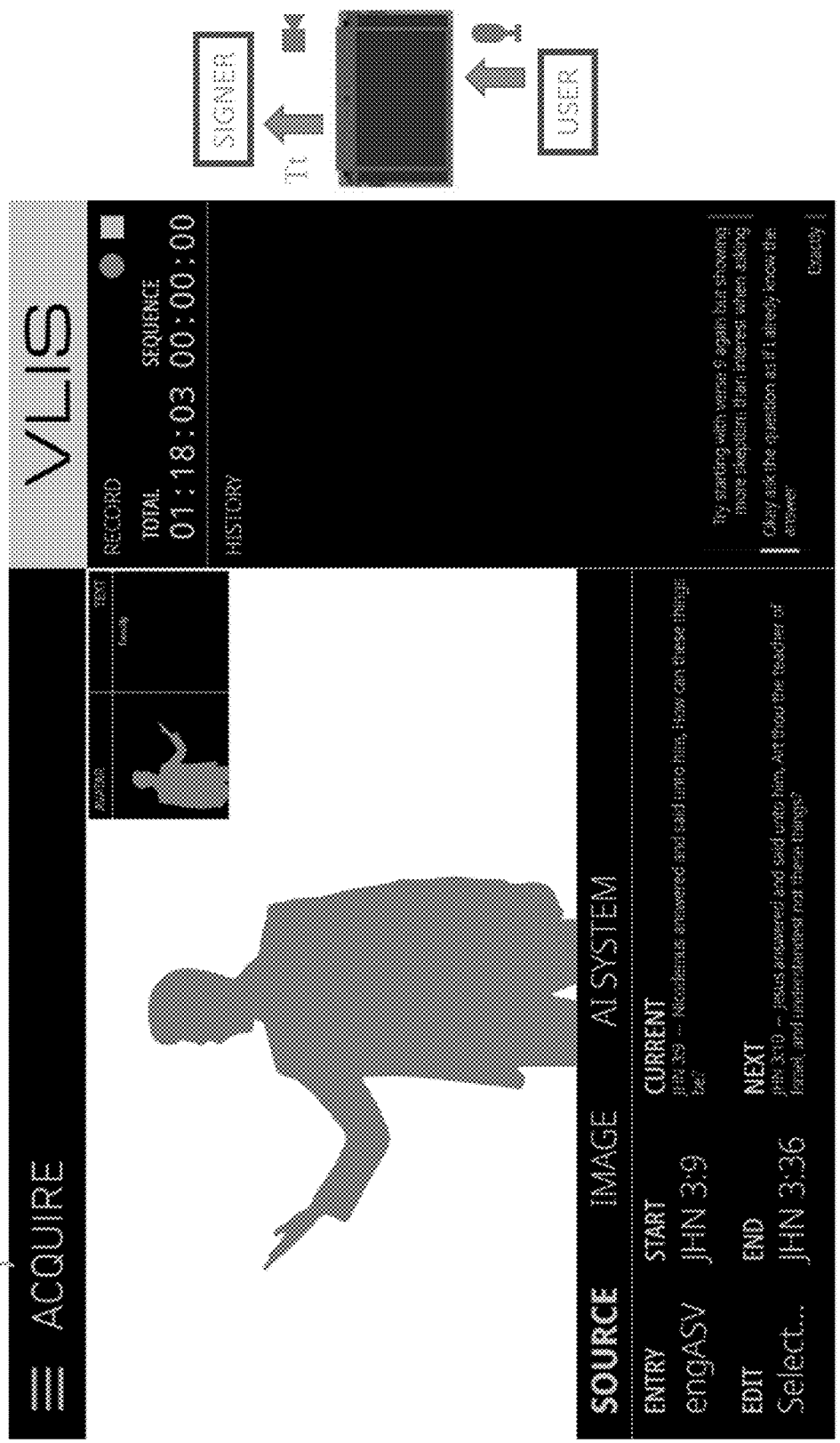

As shown in FIG. 26, the SL speaker asks a confirmation question via sign language, which is translated to text that is momentarily shown over the video in real-time and also stored in the history feed 1418 on the right hand side of the screen. As shown in FIG. 27, the user responds affirmatively (i.e., "exactly") to the SL speaker, which is again translated and shown to the SL speaker. The system remains in a two-way translation mode until either the user or the signer starts the recording process.

Figure 28:
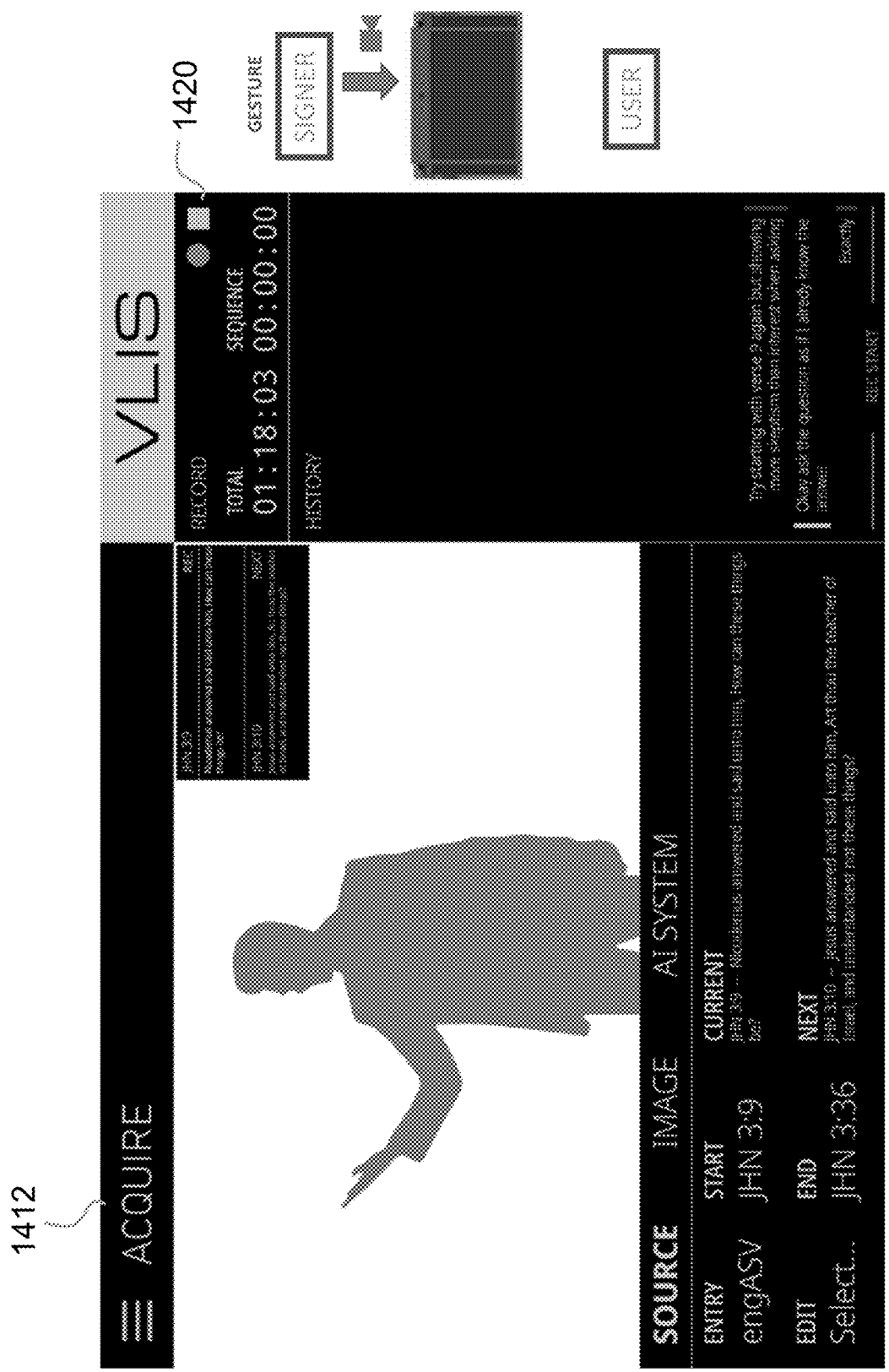

With reference to FIG. 28, recording can be initiated by the user via the recording controls 1420, by voice command, or the SL speaker can perform a "Record Start" gesture. Once recording is started the system begins recording video, translating signs, and aligning with the source text.

Figure 29:
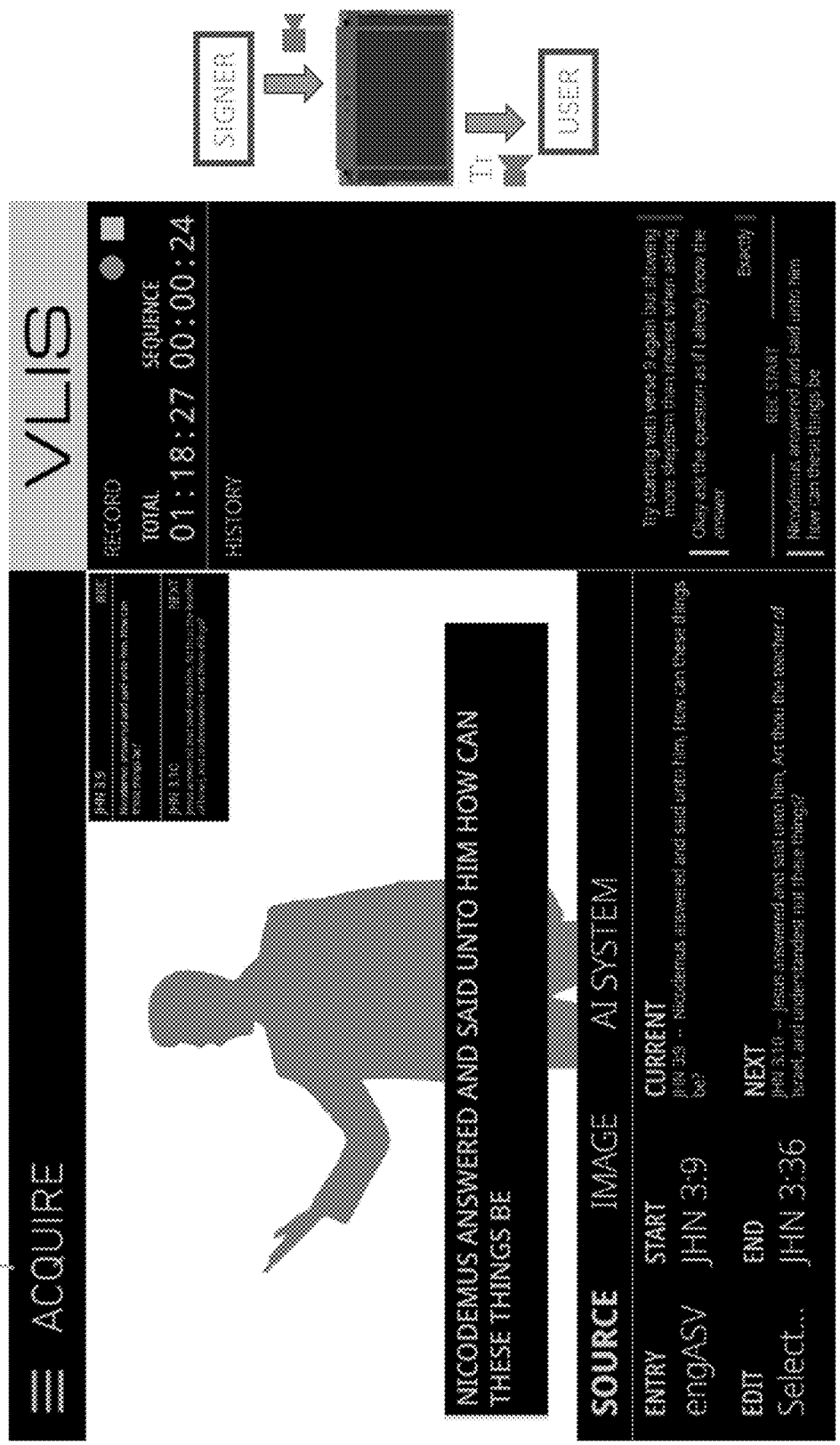
Figure 30:
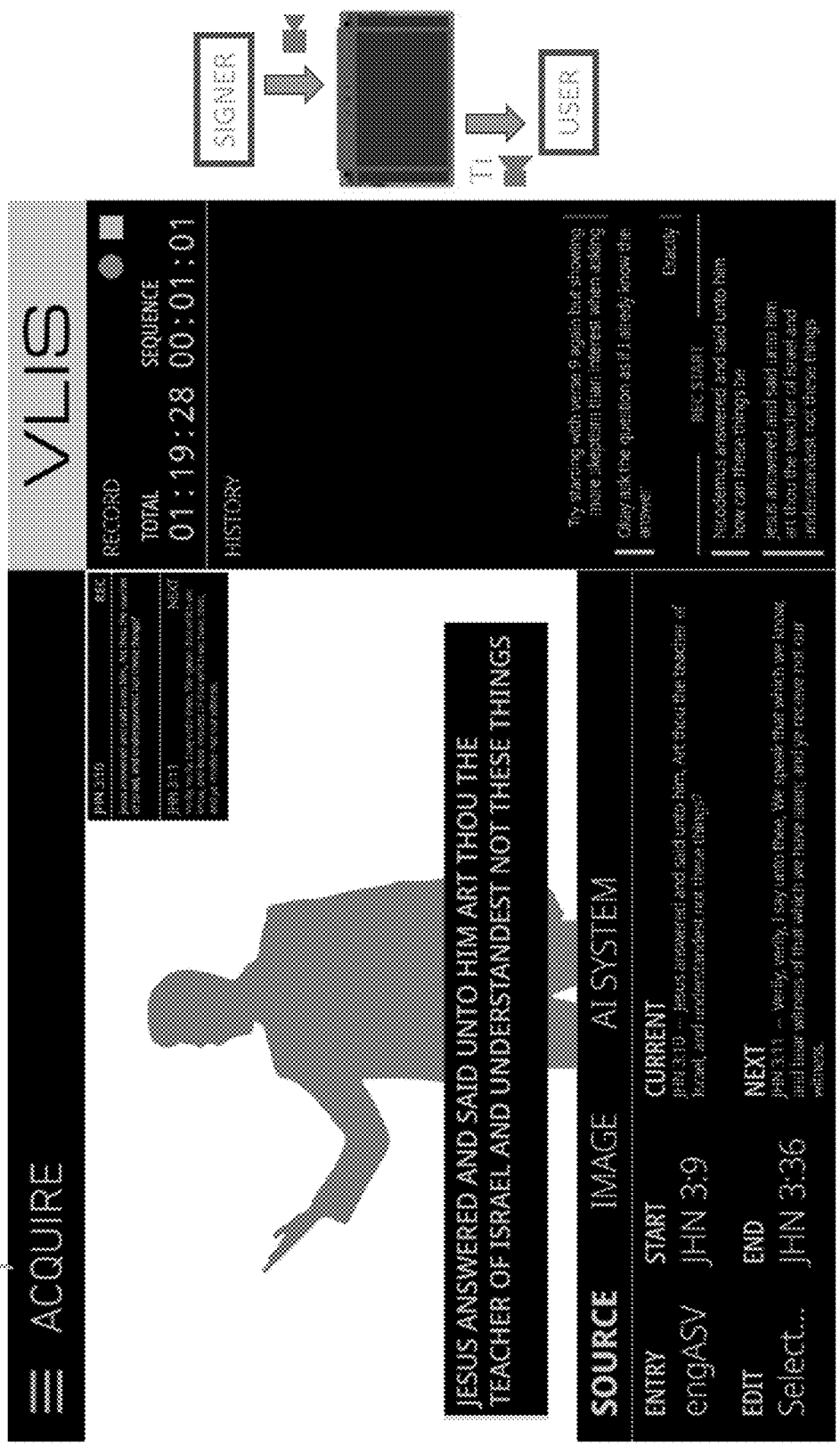

As shown in FIG. 29, the SL speaker signs the first verse displayed. The system translates this content and logs the translation in the history feed. As shown in FIG. 30, recognizing the previous verse has been signed, the system moves the "Next" prompt up to the current verse and displays the next verse in the sequence. The system translates the signs, displays a real-time output to the user, and logs the translation in the history feed.

Figure 31:
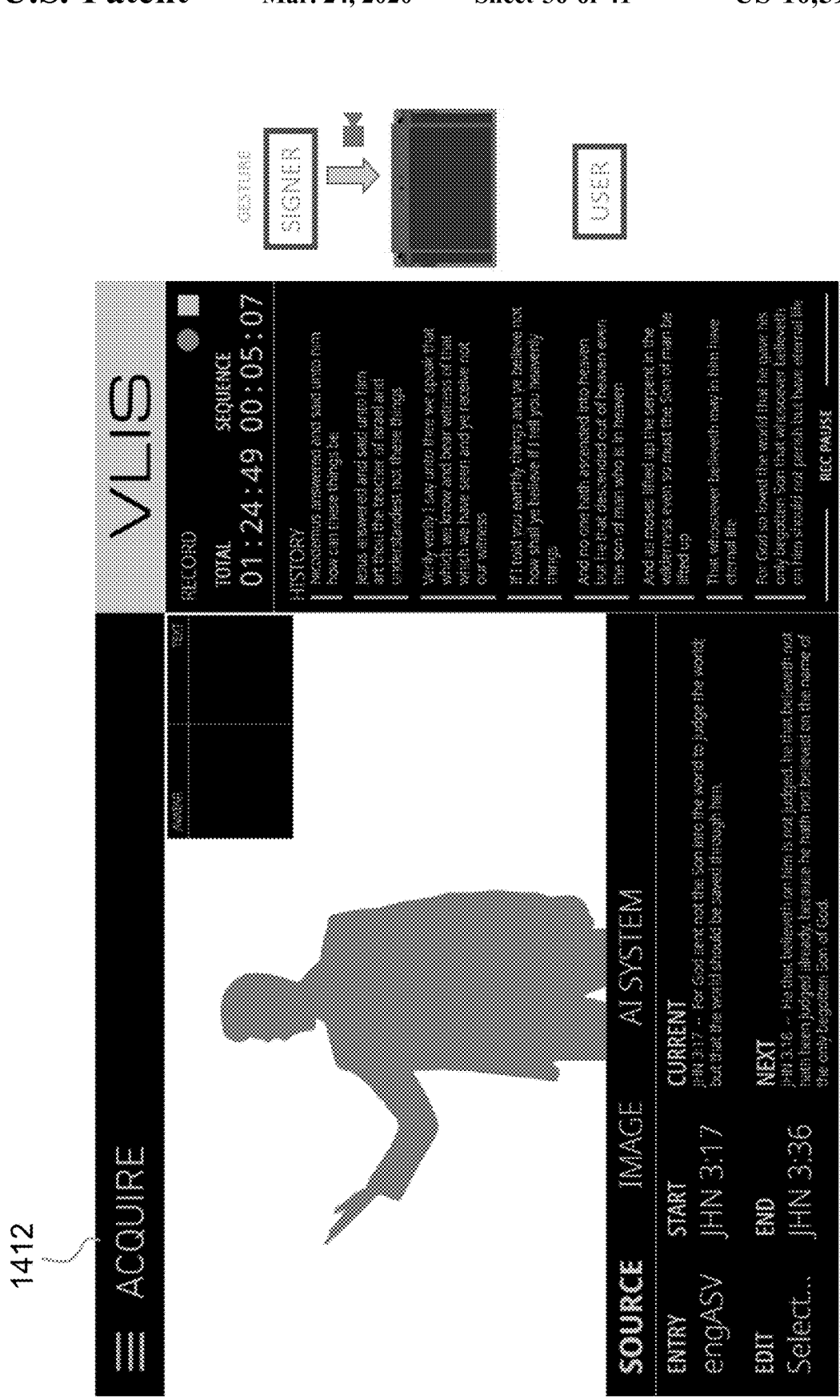
Figure 32:
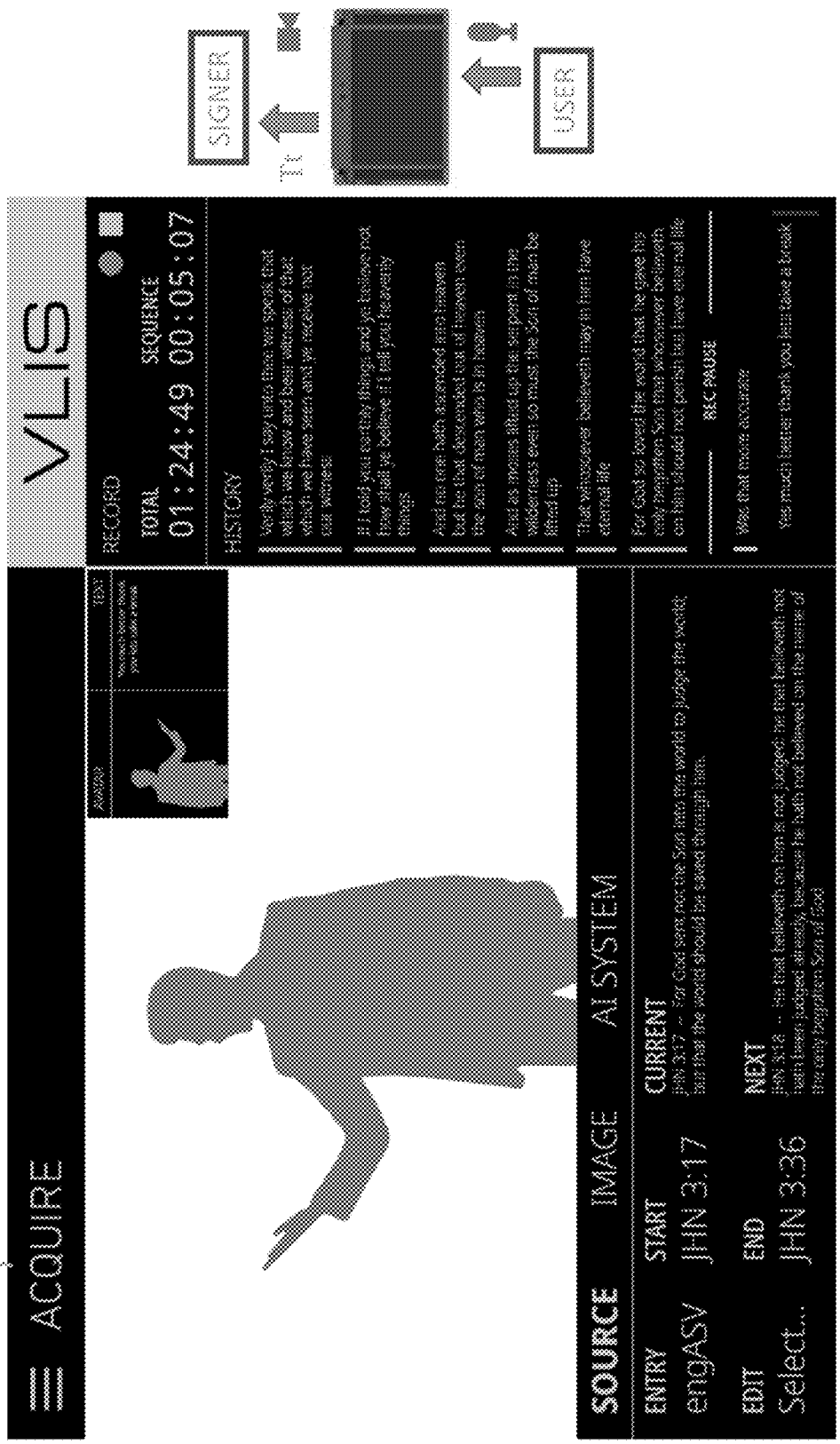

Referring to FIG. 31, the SL speaker performs a "Pause" gesture and the system pauses video recording. The system re-activates two-way translation mode at this point. As shown in FIG. 32, the SL speaker asks the user for input on the video which was just captured. This is translated into text and audio for the user. The user responds affirmatively and suggests they both take a break. This is translated to the user via avatar and text as before (FIGS. 25-27).

Figure 33:
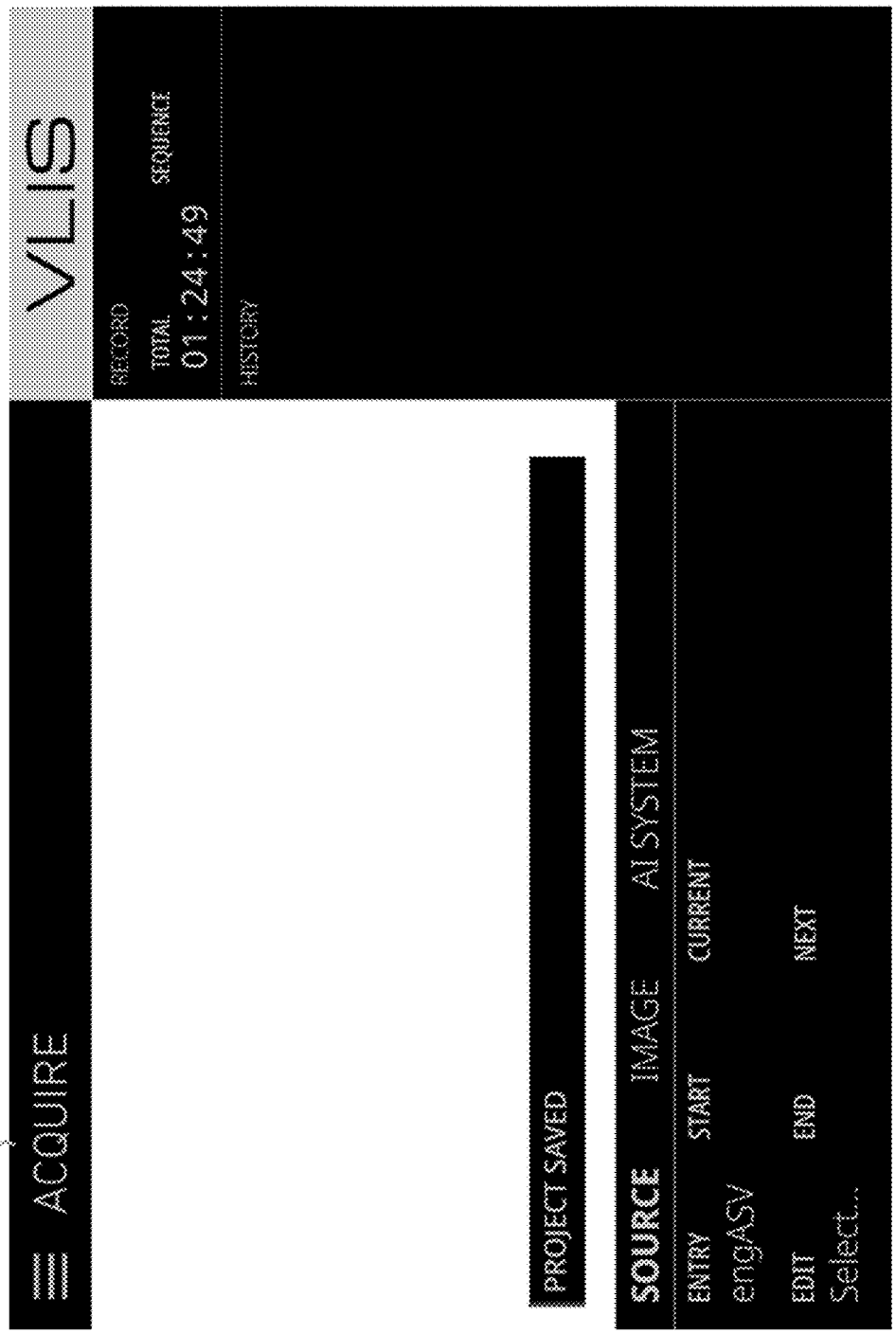

As shown in FIG. 33, the user uses a voice command to stop the session (or pushes the stop button). The system closes out the video sequence and saves the project file. The system is now ready to begin a new session or change to a different mode (e.g., edit, translate, etc.).

Figure 34:
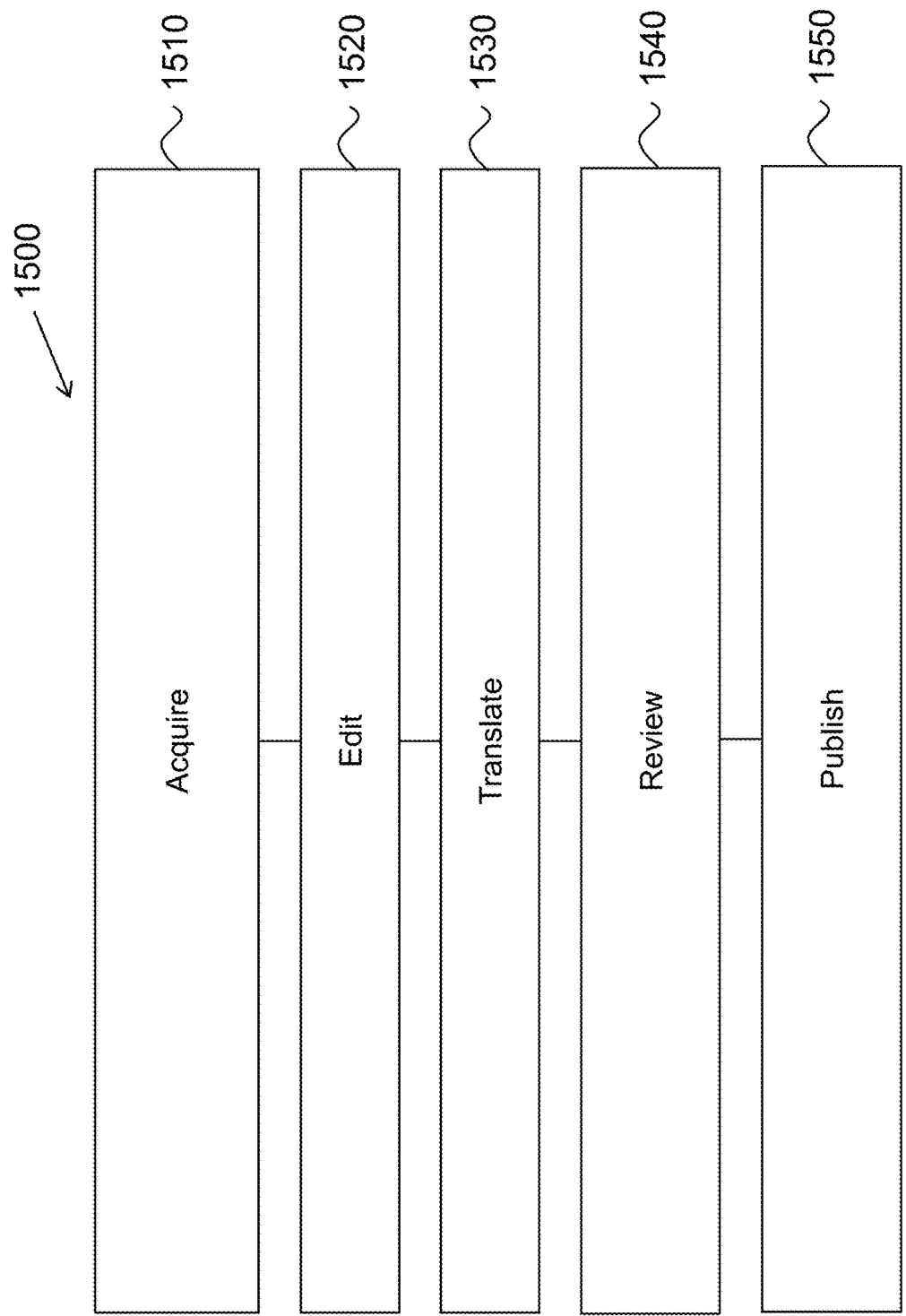
FIG. 34 illustrates a flowchart of a high level example order of operations for acquiring and publishing visual language translation content.

FIG. 34 illustrates a flowchart of a high level example order of operations (or task order flow) 1500 for acquiring and publishing visual language translation content. As noted above with respect to FIG. 13, the pages of the UI can be organized according to this task order flow. In some embodiments, the method 1500 can include, an Acquire operation 1510. The Acquire operation 1510 can include displaying content in the form of a source text (e.g., Bible verses) for translation by a sign language speaker. This operation can also include recording the sign language speaker as translation is performed. In some embodiments, the Acquire operation 1510 can include an initial display of a translation of the video content. The method 1500 can also include an Edit operation 1520. In edit operation 1520, recorded video clips and corresponding source text can be edited to produce a final video sequence. The method 1500 can further include a Translate operation 1530. The translate operation 1530 can include displaying a final video sequence, source text, translated text, and sign gloss labels for refinement of the translated content. In some embodiments, the method 1500 can include a Review operation 1540 wherein video content with source text and any available translation content can be played back for final review. The method 1500 can also include a Publish operation 1550 wherein the final video and translation content is uploaded to a server, for example.

Figure 35:
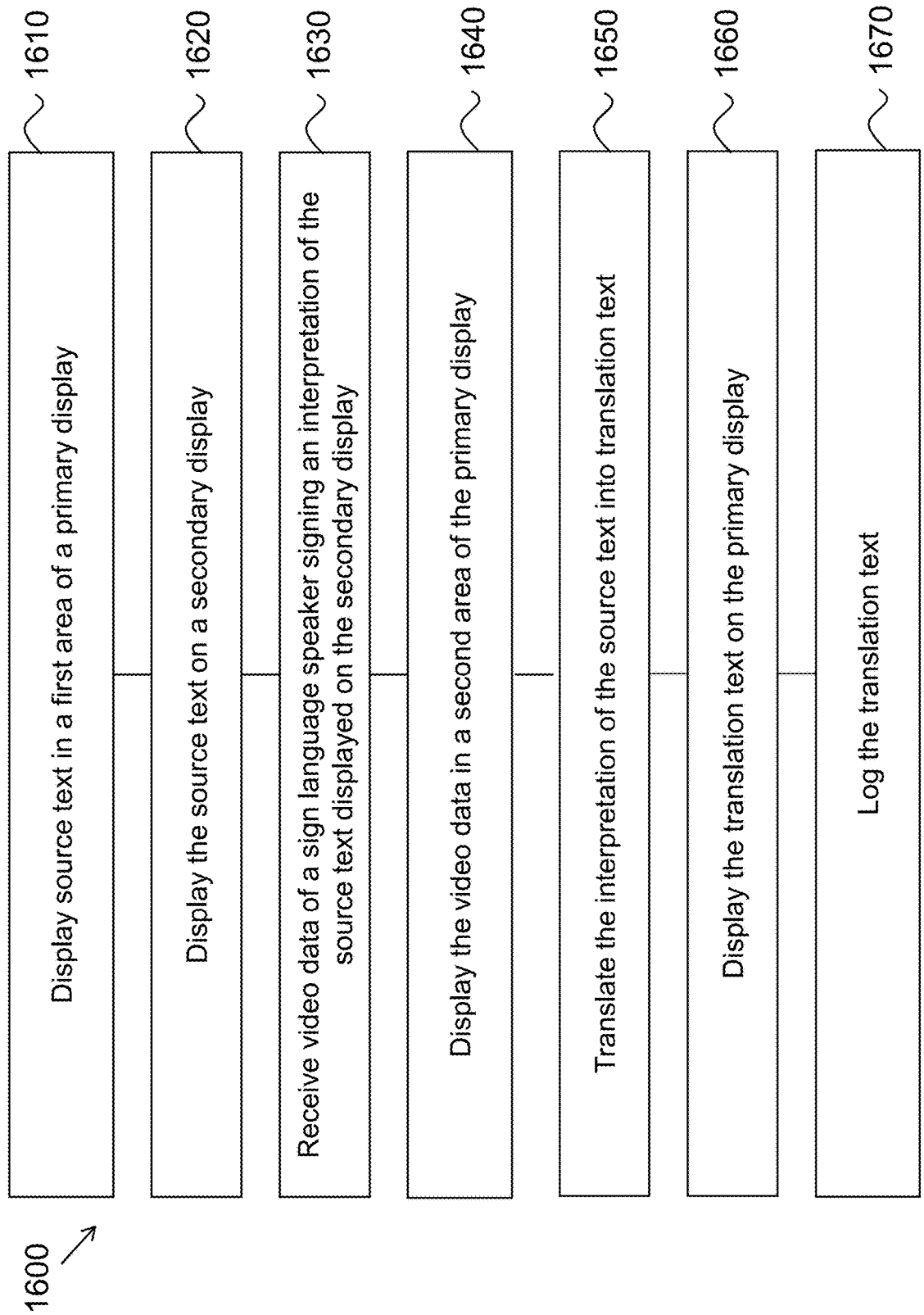
FIG. 35 illustrates a flowchart of an example method for translating a source text into sign language.

FIG. 35 illustrates a flowchart of an example method 1600 for translating a source text into sign language. The method 1600 can include, at operation 1610, displaying a selected source text in a first area of a primary display as well as displaying the source text on a secondary display facing a sign language speaker at operation 1620. For example, the source text can be displayed in a source tab of control area 1316 (FIG. 15) of the primary display 1102 (FIG. 11A) and on the secondary display 1104 (FIG. 11B). The method can include, at operation 1630, receiving video data of the sign language speaker signing an interpretation of the source text displayed on the secondary display. The video data can then be displayed in a second area of the primary display, at operation 1640, for viewing by a user. For example, the video data can be displayed in the video display area 1314 (FIG. 15). The sign language speaker's interpretation of the source text can be translated into translation text, at operation 1650, for display on the primary display, at operation 1660, for viewing by the user (e.g., to verify the accuracy of the translation) (see e.g., FIG. 29). In some embodiments, the translation text is logged at operation 1670. For example, the translation text can be logged in the translation history area 1318 (FIG. 15).

In some embodiments, the method can further include recording the video data via recording controls 1320 (FIG. 15), voice command, and/or a signed gesture. In some embodiments, displaying the translation text on the primary display includes overlaying the translation text on the second area of the primary display (see e.g., FIG. 29). In some embodiments, displaying source text in a first area of a primary display includes displaying a current source text and a next source text (see e.g., FIG. 29). In some embodiments, the method can further include detecting when the current source text has been translated and scrolling to the next source text (see e.g., FIGS. 29-31).

Figure 36:
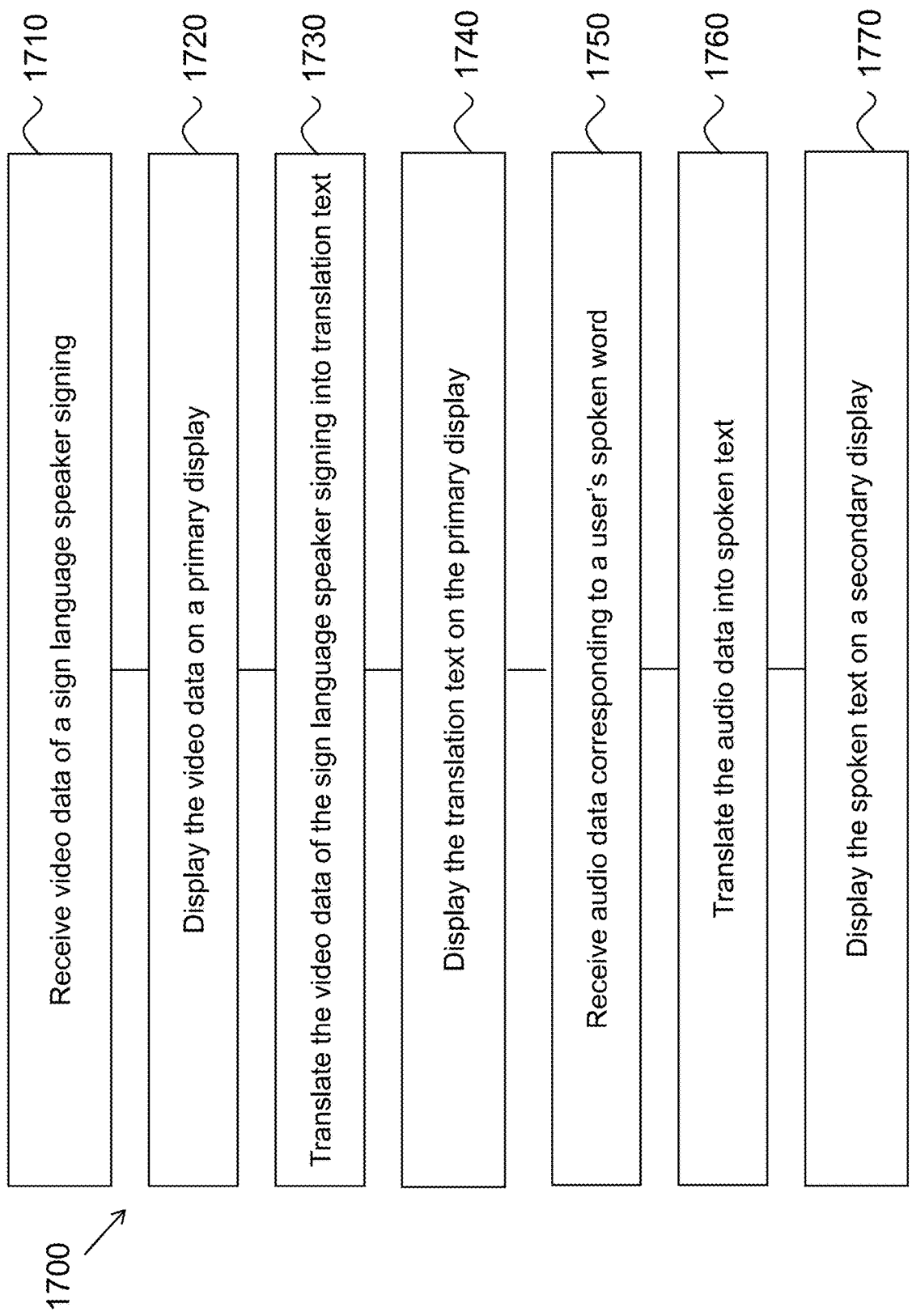
FIG. 36 illustrates a flowchart of an example method for facilitating communication between a sign language speaker and a non-sign language speaker.

FIG. 36 illustrates a flowchart of an example method 1700 for facilitating communication between a sign language speaker and a non-sign language speaker (see e.g., FIGS. 25-27). The method 1700 can include, at operation 1710, receiving video data of a sign language speaker signing, and displaying the video data on a primary display at operation 1720. For example, the video data can be displayed in the video display area 1314 (FIG. 15). The video data of the sign language speaker signing can be translated into translation text, at operation 1730, and displayed on the primary display for viewing by a user at operation 1740 (see e.g., FIG. 26). The method can also include receiving audio data corresponding to a user's spoken word, at operation 1750, and translating the audio data into spoken text at 1760. The spoken text can then be displayed on a secondary display for viewing by the sign language speaker at operation 1770 (see e.g., FIG. 27).

In some embodiments, displaying the translation text on the primary display includes overlaying the translation text on the video data displayed on the primary display (see e.g., FIG. 26). In some embodiments, the method can further include logging the translation text and the spoken text. For example, the text can be logged in the translation history area 1418 (FIG. 27).

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of at least some of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A sign language recognition device, comprising:
    a primary display facing a first direction;
    a secondary display facing a second direction;
    one or more cameras positioned adjacent the secondary display and facing the second direction, wherein an image captured by the one or more cameras is displayed on at least a portion of the primary display; and
    a support stand fixed relative to the secondary display and the one or more cameras, the support stand comprising a pair of support arms each carrying a pair of pivot pins;

wherein the primary display is pivotably and slideably coupled to the pivot pins, whereby the device is configurable between a folded configuration and an unfolded configuration such that the first and second directions face opposite each other when the device is in the folded configuration.

2. The sign language recognition device of claim 1, wherein the primary display includes two pairs of grooves each pair positioned on opposite sides of the display to receive corresponding pairs of the pivot pins.

3. The sign language recognition device of claim 2, wherein each pair of grooves includes one groove that is longer than the other.

4. The sign language recognition device of claim 3, wherein each pair of grooves converge at one end.

5. The sign language recognition device of claim 1, wherein the image captured by the one or more cameras is displayed on at least a portion of the secondary display.

6. The sign language recognition device of claim 1, wherein the one or more cameras comprises at least one of an RGB color camera, a monochrome camera, a 3D stereo camera or a multi-aperture camera.

7. The sign language recognition device of claim 1, wherein at least one of the primary display or the secondary display comprises a touchscreen display.

8. The sign language recognition device of claim 1, further comprising:

at least one of a microphone, a microphone array or a 3D microphone; and a touchscreen keyboard.

9. The sign language recognition device of claim 1, further comprising:

one or more knobs positioned proximate a top of the primary display, and configured to provide control and functionality of at least the primary display or the secondary display.

10. The sign language recognition device of claim 9, wherein the functionality and control comprises at least one of scrolling, selecting, volume, screen brightness or playback speed and direction.

11. The sign language recognition device of claim 9, wherein each of the one or more knobs comprises an axially actuated button.

12. The sign language recognition device of claim 1, further comprising:

a display mount to secure the primary display.

13. The sign language recognition device of claim 12, wherein the display mount is formed from plastic.

14. The sign language recognition device of claim 1, further comprising:

a non-visual electromagnetic sensor or a non-visual electro-optical sensor.

* * * * *